(12) United States Patent
Okura et al.

(10) Patent No.: US 8,777,194 B2
(45) Date of Patent: Jul. 15, 2014

(54) SPIRAL SPRING ASSEMBLY

(75) Inventors: Shinsuke Okura, Nagoya (JP); Toshihiro Suzuki, Nagoya (JP); Itsuo Kojima, Nagoya (JP)

(73) Assignee: Chuo Hatsujo Kabushiki Kaisha, Nagoya (JP)

( * ) Notice: Subject to any disclaimer, the term of this patent is extended or adjusted under 35 U.S.C. 154(b) by 902 days.

(21) Appl. No.: 12/087,738

(22) PCT Filed: Jan. 25, 2007

(86) PCT No.: PCT/JP2007/051140
§ 371 (c)(1),
(2), (4) Date: Jul. 14, 2008

(87) PCT Pub. No.: WO2007/086447
PCT Pub. Date: Aug. 2, 2007

(65) Prior Publication Data
US 2009/0079246 A1    Mar. 26, 2009

(30) Foreign Application Priority Data
Jan. 26, 2006    (JP) .................................. 2006-17523

(51) Int. Cl.
*F16F 1/06*    (2006.01)

(52) U.S. Cl.
USPC ........... 267/155; 267/154; 267/273; 267/199; 297/378.1; 297/292; 297/293; 297/301.4

(58) Field of Classification Search
USPC ......... 267/154, 155, 156, 272, 273, 198, 199; 297/378.1, 301.4, 292, 293
See application file for complete search history.

(56) References Cited

U.S. PATENT DOCUMENTS 3,958,828 A * 5/1976 Ishida et al. ................ 297/361.1
4,666,208 A * 5/1987 Tatematsu et al. ............ 297/341
(Continued)

FOREIGN PATENT DOCUMENTS

JP    S 48-031861 B    10/1973
JP    A-55-119238    9/1980
(Continued)

OTHER PUBLICATIONS

Aug. 2, 2011 Office Action issued in Japanese Patent Application No. 2006-017523 (with translation).
(Continued)

*Primary Examiner* — Thomas J Williams
*Assistant Examiner* — Mariano Sy
(74) *Attorney, Agent, or Firm* — Oliff PLC

(57) ABSTRACT

An object of the present invention is to provide a spiral spring assembly that is capable of suppressing lateral force generated in a central shaft. A spiral spring assembly (1) includes a central shaft (2), a spiral spring (3) that is disposed on the periphery of the central shaft (2) and includes an outer end (3a), an inner end (3b), and a spiral portion (3c) that connects the outer end (3a) and the inner end (3b) in a spiral form; an inner end fixing member (4) to which the inner end (3b) is fixed so as to be capable of transmitting torque; and an outer end fixing member (5) to which the outer end (3a) is fixed, and which is capable of moving relative to the inner end fixing member (4) within a predetermined section extending from a first state to a second state. The outer end (3a) is fixed to the outer end fixing member (5) so as to be capable of transmitting torque and suppressing a lateral force that is generated in the central shaft (2) in a predetermined state within the predetermined section.

14 Claims, 34 Drawing Sheets

(56) References Cited

U.S. PATENT DOCUMENTS

| | | | |
|---|---|---|---|
| 5,234,255 A * | 8/1993 | Kawakita | 297/354.12 |
| 5,547,254 A * | 8/1996 | Hoshihara | 297/367 R |
| 5,749,626 A * | 5/1998 | Yoshida | 297/367 R |
| 6,789,849 B2 * | 9/2004 | Gray | 297/378.12 |
| 7,093,901 B2 * | 8/2006 | Yamada | 297/367 R |
| 7,213,881 B2 * | 5/2007 | Kim et al. | 297/336 |

FOREIGN PATENT DOCUMENTS

| JP | 01303333 A * | 12/1989 | 267/154 |
|---|---|---|---|
| JP | A-6-296526 | 10/1994 | |
| JP | A-9-78137 | 3/1997 | |
| JP | A-2000-108846 | 4/2000 | |
| JP | A-2002-206580 | 7/2002 | |
| JP | A-2004-97257 | 4/2004 | |

OTHER PUBLICATIONS

May 15, 2007 Search Report for International Application No. PCT/JP2007/051140 (with translation).

Jul. 29, 2008 International Preliminary Report on Patentability issued in International Application No. PCT/JP2007/051140 (with translation).

Dec. 20, 2011 Office Action issued in Japanese patent application No. 2006-017523 (with translation).

* cited by examiner

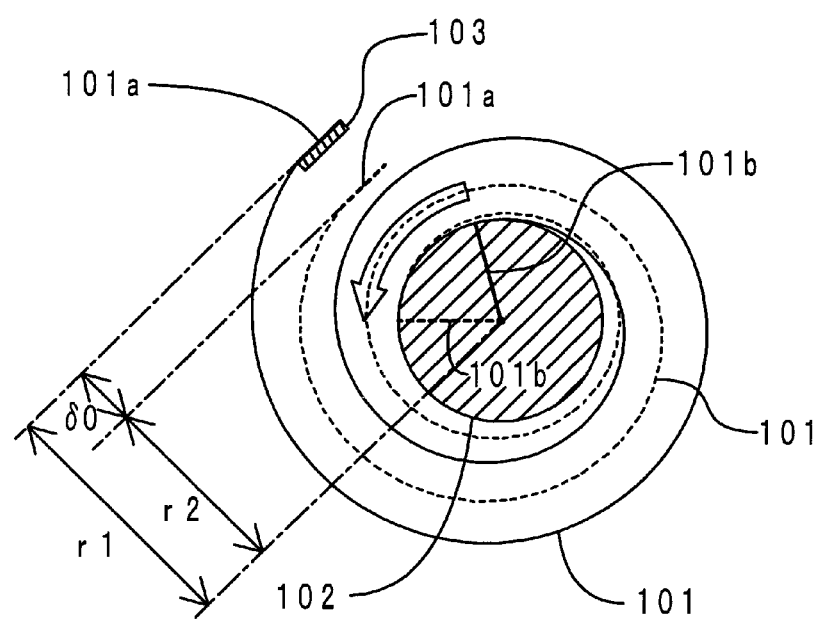
F I G. 1

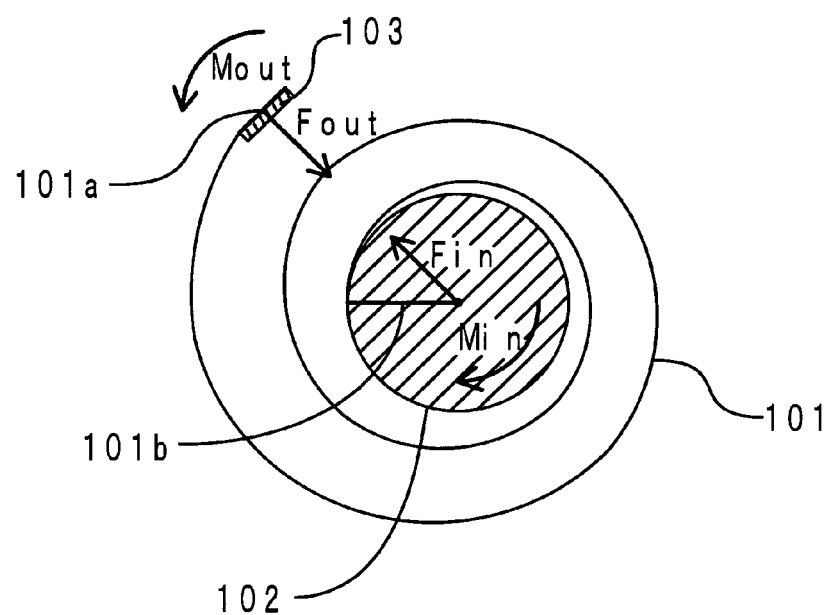
F I G. 2

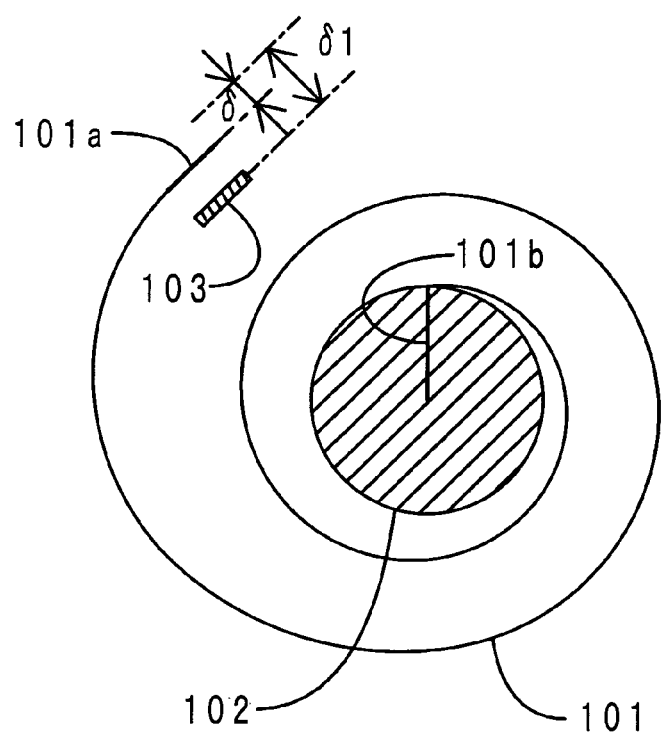
F I G. 6

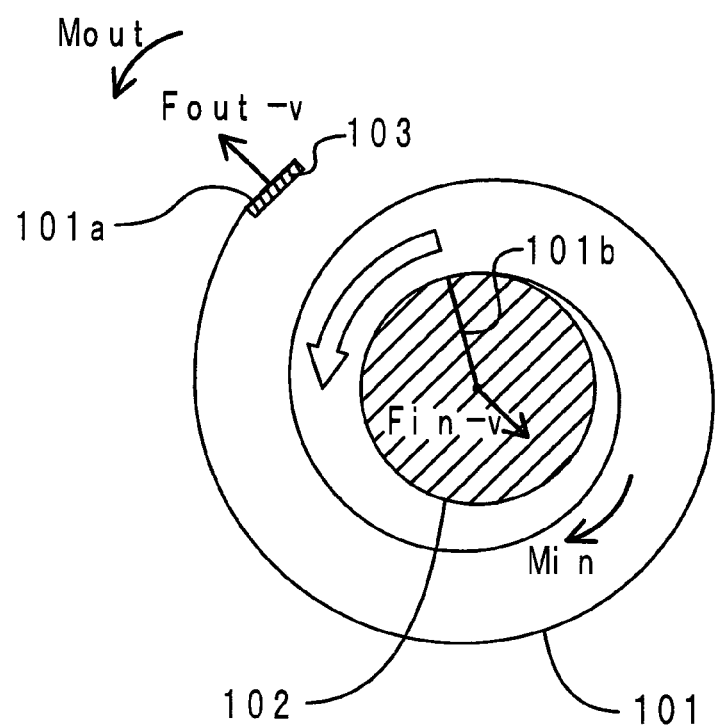
F I G. 7

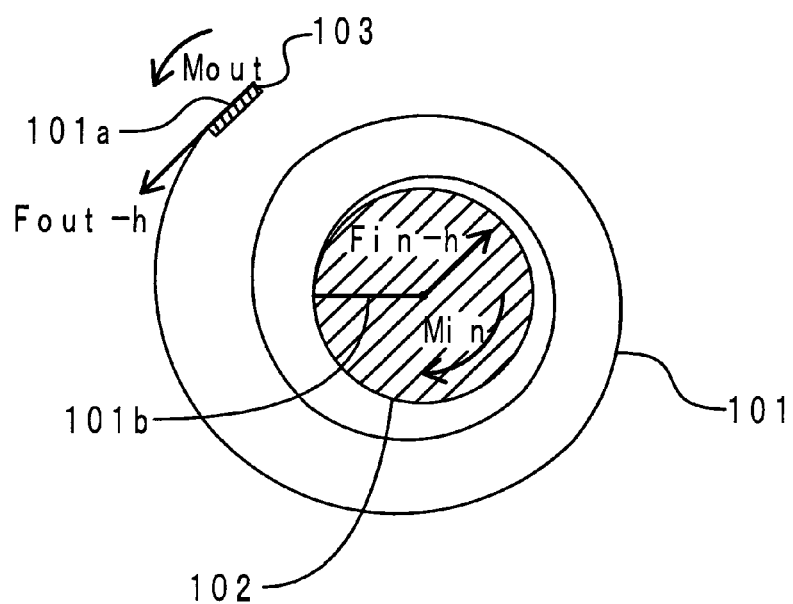
F I G. 1 1

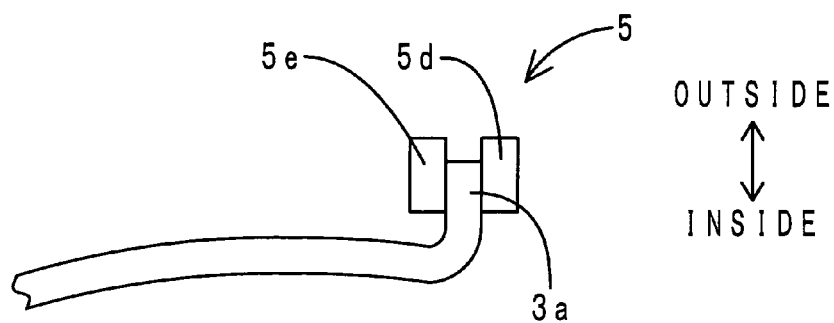
F I G. 30

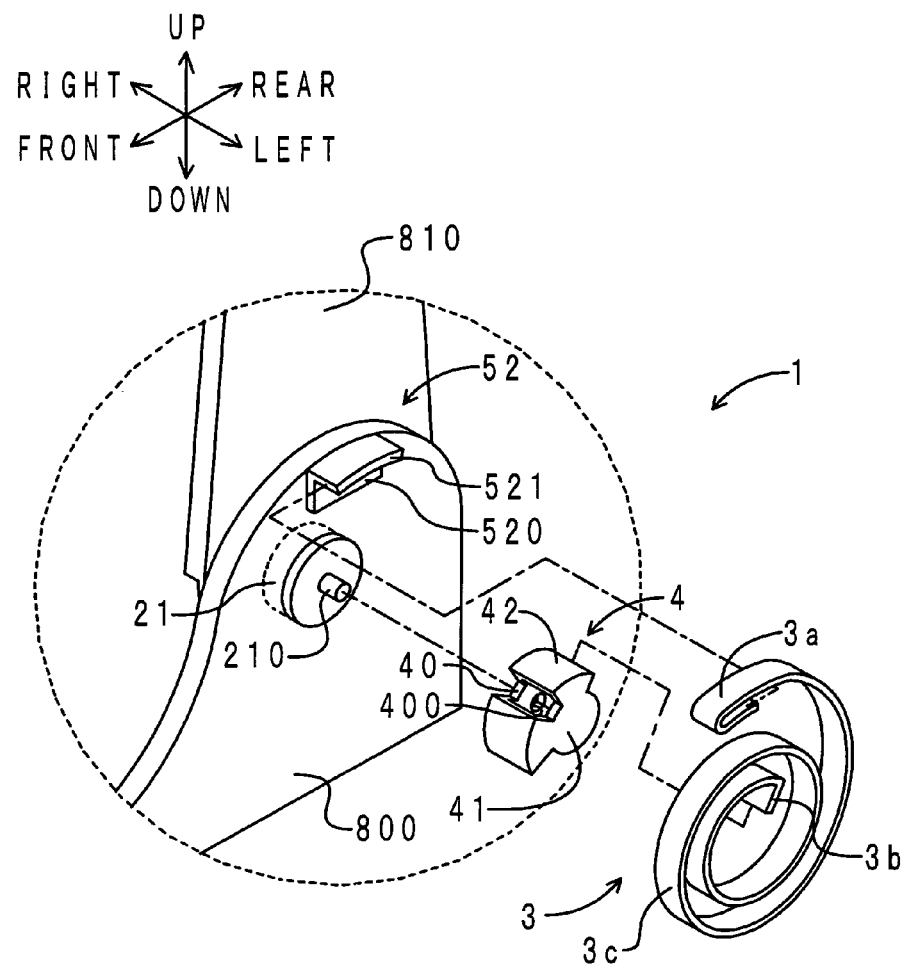
F I G. 31

SPIRAL SPRING ASSEMBLY

TECHNICAL FIELD

The present invention relates to a spiral spring assembly used in a reclining seat or a window regulator of an automobile and so on, for example.

BACKGROUND ART

Patent Documents 1 and 2, for example, introduce a spiral spring assembly used to bias a seat back of a reclining seat. FIG. 34 is a pattern diagram showing a spiral spring assembly.

As shown in FIG. 34, a spiral spring assembly 900 includes a non-contact spiral spring 901, a central shaft 902, and a pin 903. The central shaft 902 connects a seat cushion (not shown) to a seat back (not shown). The seat back is capable of tilting relative to the seat cushion in a front-rear direction about the central shaft 902.

The pin 903 is fixed to the seat back. The non-contact spiral spring 901 is disposed on both axial ends of the central shaft 902. The non-contact spiral spring 901 includes an outer end 901a and an inner end 901b. The outer end 901a is hooked onto the pin 903. The inner end 901b is fixed to the central shaft 902.

When the seat back is tilted rearward, the pin 903 tilts rearward together with the seat back. As a result, the non-contact spiral spring 901 tightens. This tightening causes elastic energy to accumulate in the non-contact spiral spring 901. The elastic energy is used as biasing energy when the seat back is tilted forward.

[Patent Document 1] Japanese Patent Application Publication No. JP-A-H6-296526
[Patent Document 2] Japanese Patent Application Publication No. JP-A-2004-97257

DISCLOSURE OF THE INVENTION

Problems to be Solved by the Invention

Incidentally, the outer end 901a of the non-contact spiral spring 901 is simply hooked onto the pin 903. Therefore, when the seat back is tilted rearward or forward, rotation of the outer end relative to the pin 903 is not constrained in any way (to be referred to hereafter as "the outer end is free" where appropriate). Accordingly, the load balance of the spiral spring assembly 900 is as shown in FIG. 34. Specifically, a load Fout is generated in the outer end 901a, and a load Fin is generated in the inner end 901b. Further, torque Min is generated in the inner end 901b in a direction for suppressing rotation of the non-contact spiral spring 901 by the two loads Fout, Fin.

Hence, when the outer end is free, the load Fin is inevitably generated in the inner end 901b. As a result, smooth rotation of the central shaft 902 is impeded by the load Fin. More specifically, the responsiveness when tilting the seat back forward deteriorates.

Furthermore, a load that acts in an axis perpendicular direction is generated in the central shaft 902 by the weight of the seat back, friction between the seat back and seat cushion, and so on. When this load and the load Fin act in the same direction, the responsiveness when tilting the seat back forward deteriorates further.

Here, lateral force may be suppressed by adjusting the position of the pin 903 relative to the central shaft 902. In other words, lateral force may be suppressed by causing the load Fout to act in an opposite direction to the direction in which the lateral force acts. However, when the outer end is free, precise control of the load Fout is difficult.

A spiral spring assembly according to the present invention has been designed in consideration of the problems described above. Accordingly, an object of the present invention is to provide a spiral spring assembly that can suppress lateral force (a load acting in an axis perpendicular direction) generated in a central shaft.

Means for Solving the Problem (1) To solve the problems described above, a spiral spring assembly according to the present invention includes: a central shaft; a spiral spring that is disposed on the periphery of the central shaft and includes an outer end, an inner end, and a spiral portion that connects the outer end and the inner end in a spiral form; an inner end fixing member to which the inner end is fixed so as to be capable of transmitting torque; and an outer end fixing member to which the outer end is fixed, and which is capable of moving relative to the inner end fixing member within a predetermined section extending from a first state to a second state. The outer end is fixed to the outer end fixing member so as to be capable of transmitting torque and suppressing a lateral force that is generated in the central shaft in a predetermined state within the predetermined section.

Here, the outer end fixing member "is capable of moving relative to the inner end fixing member" includes a case in which the outer end fixing member moves relative to an immobile inner end fixing member, a case in which the inner end fixing member moves (including a spinning movement) relative to an immobile outer end fixing member, and so on, for example.

The outer end and the outer end fixing member are connected so as to be capable of transmitting torque (to be referred to as "the outer end is fixed" hereafter where appropriate). When the outer end is fixed, loads are generated in the outer end and the inner end such that the outer end and the inner end are widen by an amount corresponding to the tightening of the spiral spring in the predetermined state. In the spiral spring assembly according to the present invention, the lateral force that is generated in the central shaft is suppressed by controlling the magnitude (including 0), direction, and so on of at least one of the loads generated in the outer end and the inner end (to be referred to as the "outer/inner end loads" hereafter where appropriate).

According to the spiral spring assembly of the present invention, when a peripheral member (a bearing or the like, for example) of the central shaft causes lateral force to act on the central shaft, for example, the lateral force can be suppressed by controlling the outer/inner end loads. Further, when the outer/inner end loads themselves impede rotation of the central shaft (i.e. when the outer end or the inner end causes lateral force to act on the central shaft), for example, the lateral force can be suppressed by controlling the outer/inner end loads.

(2) In the spiral spring assembly constituted as described above in (1), the first state is preferably a minimum load state within the predetermined section, in which an elastic energy stored in the spiral spring is at a minimum, and the second state is preferably a maximum load state within the predetermined section, in which the elastic energy is at a maximum.

In other words, with the spiral spring assembly according to this constitution, the relative movement section between the inner end fixing member and the outer end fixing member (i.e. the predetermined section) corresponds to a section extending from the minimum load state to the maximum load state. According to the spiral spring assembly of this constitution, relative movement between the inner end fixing member and the outer end fixing member can be performed smoothly.

(3) In the spiral spring assembly constituted as described above in (2), in the minimum load state, the outer end preferably applies a load to the outer end fixing member in at least one direction of a diametrical direction and a tangential direction.

The two directions in which loads can be generated in the outer end (the diametrical direction and the tangential direction) intersect each other at substantially 90°. By adjusting the magnitude of these two loads, the direction and magnitude of a resulting force of the two loads can be controlled. Meanwhile, a resulting force is generated in the inner end in an opposite direction to the resulting force generated in the outer end. By adjusting the magnitude of the two loads that can be generated in the outer end in this manner, the direction and magnitude of the resulting force generated in the outer end and the direction and magnitude of the resulting force generated in the inner end (in other words, the direction and magnitude of the outer/inner end loads) can be controlled freely.

(4) In the spiral spring assembly constituted as described above in (3), the outer end and the outer end fixing member are preferably disposed in substantially identical diametrical positions in the minimum load state, and in a pre-setting state before the outer end and the outer end fixing member are fixed, the outer end and the outer end fixing member are preferably disposed at a remove from each other in the diametrical direction.

In the pre-setting state, the outer end and the outer end fixing member are disposed at a remove from each other in the diametrical direction. In the minimum load state, on the other hand, the outer end and the outer end fixing member are disposed in substantially identical diametrical positions. Therefore, when the spiral spring is set on the inner end fixing member and the outer end fixing member, the outer end must be displaced elastically in the diametrical direction to the position of the outer end fixing member. A diametrical direction load is generated in the outer end in accordance with the diametrical direction displacement amount. Further, a load is generated in the inner end in an opposite direction to this load. According to the spiral spring assembly of this constitution, the outer/inner end loads can be generated through a comparatively simple operation in which the outer end of the spiral spring is deformed in the diametrical direction relative to the outer end fixing member in advance, in the pre-setting state.

(5) In the spiral spring assembly constituted as described above in (3), the outer end and the outer end fixing member are preferably disposed such that respective extension directions thereof are substantially parallel in the minimum load state, and in a pre-setting state before the outer end and the outer end fixing member are fixed, the outer end and the outer end fixing member are preferably disposed such that the respective extension directions thereof intersect.

In the pre-setting state, the outer end and the outer end fixing member are disposed such that the respective extension directions thereof intersect. In the minimum load state, on the other hand, the outer end and the outer end fixing member are disposed such that the respective extension directions thereof are substantially parallel. Therefore, when the spiral spring is set on the inner end fixing member and the outer end fixing member, the outer end must be bent elastically to the position of the outer end fixing member. Torque is generated in the outer end in accordance with the bending amount. Also, a load is generated in the outer end in the tangential direction in accordance with the torque. Further, a load is generated in the inner end in an opposite direction to this load. According to the spiral spring assembly of this constitution, the outer/inner end loads can be generated through a comparatively simple operation in which the outer end of the spiral spring is bent relative to the outer end fixing member in advance, in the pre-setting state.

(6) In the spiral spring assembly constituted as described above in (1), the spiral spring is preferably a non-contact spiral spring in which adjacent parts thereof in a diametrical direction do not contact each other in a pre-setting state before the outer end and the outer end fixing member are fixed.

According to the spiral spring assembly of this constitution, the need to take friction between adjacent parts in the diametrical direction into account in the predetermined state is reduced (a case in which adjacent parts in the diametrical direction come into contact with each other in the predetermined state is included in this constitution). As a result, the outer/inner end loads can be controlled with a higher degree of precision.

(7) In the spiral spring assembly constituted as described above in (6), in the predetermined state, the spiral portion is preferably defined, in relation to a boundary line that extends in a substantially perpendicular direction to the direction of a load applied to the outer end by the outer end fixing member and passes through an axial center of the central shaft, by a load side section positioned in the direction of the load and an anti-load side section positioned on the opposite side of the boundary line to the load side section, and in the pre-setting state, an average pitch of parts constituting the anti-load side section, excluding a part that forms a continuation of the outer end, is preferably set to be larger than an average pitch of parts constituting the load side section.

Here, "the part that forms a continuation of the outer end" indicates the part of the spiral portion adjacent to the outer end. In the pre-setting state, the outer end is displaced relative to the outer end fixing member in the diametrical direction, a direction in which the respective extension directions of the outer end and the outer end fixing member intersect, and so on, for example. The part of the spiral portion that is deformed in order to set this displacement corresponds to "the part that forms a continuation of the outer end".

In the predetermined state, the spiral portion of the spiral spring is divided into the load side section and the anti-load side section. The load side section and anti-load side section are partitioned by the boundary line. The boundary line extends in a substantially perpendicular direction to the direction of the load that is applied to the outer end by the outer end fixing member. The boundary line also passes through the axial center of the central shaft.

If the spiral portion is set at an equal pitch, the pitch (wire distance) of the parts constituting the anti-load side section becomes smaller in the predetermined state than in the pre-setting state. Here, if wire contact occurs in the spiral portion, initial release torque generated when the maximum load state is released decreases rapidly due to wire friction. As a result, a deterioration of the responsiveness of the spiral spring assembly may occur.

According to the spiral spring assembly of this constitution, however, the average pitch of the parts constituting the anti-load side section is set in advance to be larger than the average pitch of the parts constituting the load side section in the pre-setting state. Therefore, in the maximum load state, there is little danger of the parts constituting the anti-load side section coming into contact with each other. Accordingly, the initial release torque generated when releasing the maximum load state is unlikely to decrease rapidly as a result of wire friction.

(8) The predetermined state is preferably a maximum load state within the predetermined section, in which an elastic energy stored in the spiral spring is at a maximum. According to the spiral spring assembly of this constitution, lateral force generated in the central shaft in the maximum load state can be suppressed.

Effects of the Invention

According to the spiral spring assembly of the present invention, lateral force generated in the central shaft can be suppressed.

BRIEF DESCRIPTION OF THE DRAWINGS

FIG. 1 is a pattern diagram of a spiral spring assembly serving as an embodiment of the present invention.

FIG. 2 is a pattern diagram of a case in which an outer end is fixed to an outer end fixing member in a maximum load state of FIG. 1.

FIG. 6 is a pattern diagram showing the spiral spring assembly in the pre-setting state in a case where a diametrical direction load is generated in the inner end.

FIG. 7 is a pattern diagram showing the minimum load state of the spiral spring assembly of FIG. 6.

FIG. 11 is a pattern diagram showing the maximum load state of the spiral spring assembly of FIG. 10.

FIG. 30 is an enlarged view of the vicinity of an outer end of a spiral spring assembly according to a seventh embodiment.

FIG. 31 is an exploded perspective view of a spiral spring assembly according to an eighth embodiment.

Figure 3:
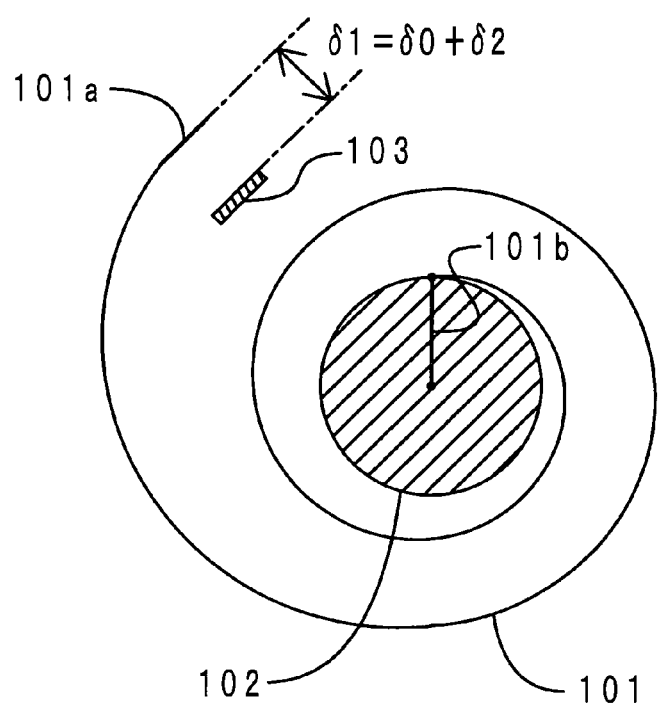
FIG. 3 is a pattern diagram showing the spiral spring assembly in a pre-setting state in a case where a load is not generated in an inner end.

DESCRIPTION OF REFERENCE SYMBOLS 1 spiral spring assembly
101 non-contact spiral spring
101a outer end
101b inner end
102 central shaft
103 outer end fixing member
2 shaft (central shaft)
20 pin
21 shaft (central shaft)
210 pin
3 non-contact spiral spring
3a outer end
3aa inner diameter side wall portion
3ab outer diameter side wall portion
3aba fixing portion
3abb introduction portion
3ac clasp portion
3b inner end
3c spiral portion
3ca load side section
3cb anti-load side section
4 inner end fixing member
40 inside circular plate portion
400 pin hole
41 outside circular plate portion
42 bridge portion
43 inner end fixing portion (inner end fixing member)
430 slit 5 outer end fixing member
5a outer end fixing pin
5b outer end fixing pin
5c outer end fixing pin
5d outer end fixing piece
5e outer end fixing piece
50 base portion
51 outer end fixing portion
52 outer end fixing member
520 base portion
521 outer end fixing portion
7 inner end fixing member
70 inside circular plate portion
700 pin hole
71 outside circular plate portion
72 bridge portion
73 upper wing portion
730 step
74 rear wing portion
740 step
8 seat
80 seat cushion
800 cushion frame
81 seat back
810 back frame
900 spiral spring assembly
901 non-contact spiral spring
901a outer end
901b inner end
902 central shaft
903 pin
A center
A' center
E outer end connecting part
F load
F' lateral force
F'' load
Fin load
Fout load
L1 load direction
L2 boundary line
Min torque
Mout torque
O axial center
P1 pitch
P2 pitch
r1 radius
r2 radius
δ correction amount
δ' correction amount
δ0 tightening amount (from minimum load state to maximum load state)
δ1 total shift amount
δ2 winding shift amount (from pre-setting state to minimum load state)
θ angle
θ' angle

BEST MODES FOR CARRYING OUT THE INVENTION

Embodiments of a spiral spring assembly according to the present invention will be described below. First, a method of controlling outer/inner end loads in the spiral spring assembly will be described. The principles of the method of controlling the outer/inner end loads are common to each of the embodiments.

[Method of Controlling Outer/Inner End Loads]

An example of a method of controlling the outer/inner end loads will be described below using pattern diagrams. For convenience, a constitution in which an inner end fixing member is connected to a central shaft will be described. In other words, a case in which lateral force generated in the central shaft is suppressed by a load generated in an inner end, from among an inner end and an outer end, will be described. A non-contact spiral spring (included in the spiral spring assembly constituted as described above in (6)) is used as a spiral spring. Further, the outer end is immobile, whereas the inner end rotates (i.e. the central shaft is caused to spin). Further, a first state indicates a minimum load state, while a second state indicates a maximum load state (included in the spiral spring assembly constituted as described above in (2)). Further, a predetermined state indicates a maximum load state (included in the spiral spring assembly constituted as described above in (8)). Also, the reference symbols in the pattern diagrams to be described below are used consistently throughout.

Note that the pattern diagrams to be described below are used only to describe a method of controlling the outer/inner end loads, and do not limit the content of the present invention (for example, the shape, size, and so on of the spiral spring, central shaft, inner end fixing member, and outer end fixing member) in any way.

Hereafter, (1) a method of preventing a load from being generated in the inner end in the maximum load state, (2) a method of generating a diametrical direction load in the inner end in the maximum load state, and (3) a method of generating a substantially orthogonal direction (to be abbreviated to "orthogonal direction" hereafter where appropriate) load in the inner end in the maximum load state will be described separately.

(1) Method of Preventing a Load from being Generated in the Inner End in the Maximum Load State In this method, the outer end is shifted in advance, in a pre-setting state, in an outer diametrical direction by an amount corresponding to the amount by which the non-contact spiral spring tightens when switching from the minimum load state to the maximum load state. First, the tightening amount when switching from the minimum load state to the maximum load state will be described. FIG. 1 is a pattern diagram showing the spiral spring assembly. As shown in FIG. 1, an outer end 101a of a non-contact spiral spring 101 in the minimum load state (indicated by a solid line in the drawing) is removed from the axial center of a central shaft (inner end fixing member) 102 by a radius r1. When the central shaft 102 (i.e. an inner end 101b) is rotated in a direction indicated in the drawing by a black-outlined arrow from this state and the outer end 101a is not fixed in a diametrical direction, the non-contact spiral spring 101 tightens into the maximum load state. The outer end 101a of the non-contact spiral spring 101 in the maximum load state (indicated by a dotted line in the drawing) is removed from the axial center of the central shaft 102 by a radius r2. A differential radius δ0 (=r1−r2) corresponds to the tightening amount.

Next, outer/inner end loads that are generated in accordance with the tightening amount will be described. When the outer end 101a is fixed to an outer end fixing member 103 in the maximum load state, a load corresponding to the tightening amount δ0 is generated in both the outer end 101a and the inner end 101b. FIG. 2 is a pattern diagram showing a case in which the outer end 101a is fixed to the outer end fixing member 103 in the maximum load state of FIG. 1. In the drawing, a load Fout indicates a load applied to the outer end fixing member 103 by the outer end 101a, Mout indicates torque applied to the outer end fixing member 103 by the outer end 101a, a load Fin indicates a load applied to the central shaft 102 by the inner end 101b, and Min indicates torque applied to the central shaft 102 by the inner end 101b.

As shown in FIG. 2, when the outer end 101a is fixed to the outer end fixing member 103, the load Fout (a load that causes the outer end 101a to attempt to move in an inner diametrical direction) and the load Fin (a load that causes the inner end 101b to attempt to move in the outer diametrical direction) are generated in accordance with the tightening amount δ0 of FIG. 1. Therefore, if these loads Fout, Fin can be eliminated, the load Fin will not be generated in the inner end in the maximum load state.

Next, the pre-setting state of the spiral spring assembly used in this method will be described. FIG. 3 is a pattern diagram showing the pre-setting state of the spiral spring assembly in a case where a load is not generated in the inner end. As shown in FIG. 3, the outer end 101a is shifted substantially in parallel in the outer diametrical direction by a total shift amount δ1 (=δ0 (the tightening amount when moving from the minimum load state to the maximum load state)+ δ2 (a winding shift amount when moving from the pre-setting state to the minimum load state). In other words, the outer end 101a is shifted in advance, assuming the tightening amount of the non-contact spiral spring 101 when switched from the minimum load state to the maximum load state.

Figure 4:
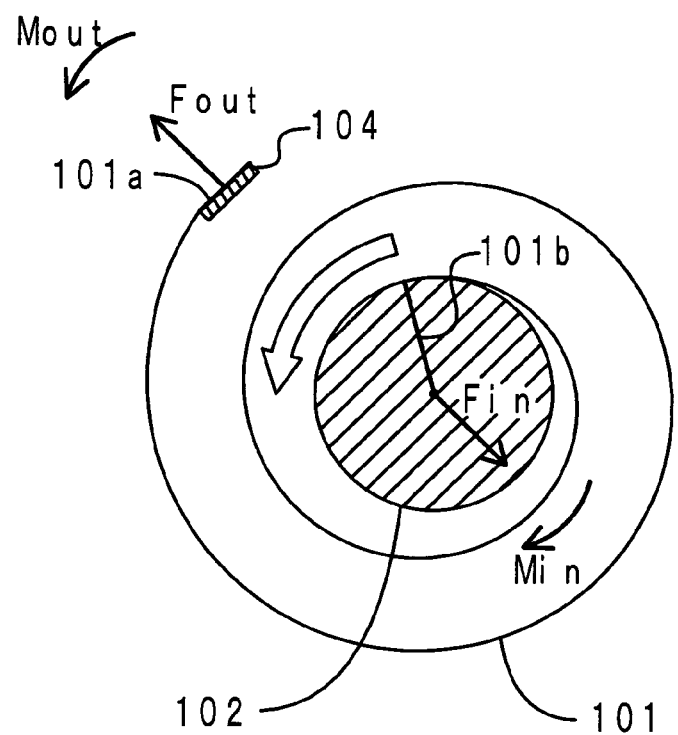
FIG. 4 is a pattern diagram showing a minimum load state of the spiral spring assembly of FIG. 3.

Next, the minimum load state of the spiral spring assembly used in this method will be described. FIG. 4 is a pattern diagram showing the minimum load state of the spiral spring assembly of FIG. 3. As shown in FIG. 4, the inner end 101b is rotated in a counter-clockwise direction by a predetermined angle in comparison with the pre-setting state shown in FIG. 3. As a result of this rotation, the non-contact spiral spring 101 tightens by the winding shift amount δ2 shown in FIG. 3. Hence, in comparison with the pre-setting state shown in FIG. 3, the outer end 101a is fixed to the outer end fixing member 103 after elastically deforming in the inner diametrical direction by the tightening amount δ0. Accordingly, an outer diametrical direction load Fout is generated in the outer end 101a. Furthermore, a load Fin is generated in the inner end 101b in the opposite direction to the load Fout. Also, clockwise direction torque Min is generated in the inner end 101b. Further, counter-clockwise direction torque Mout is generated in the outer end 101a.

Figure 5:
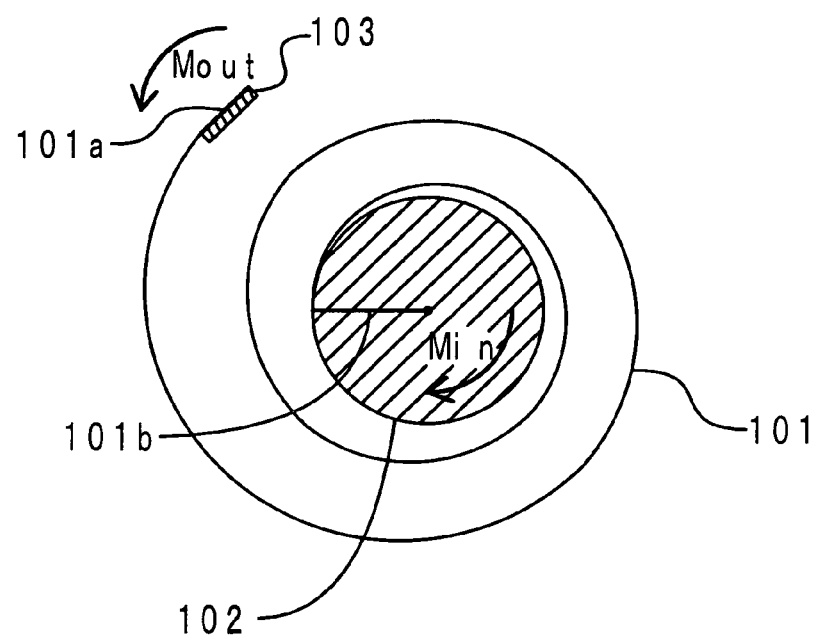
FIG. 5 is a pattern diagram showing a maximum load state of the spiral spring assembly of FIG. 4.

Next, the maximum load state of the spiral spring assembly used in this method will be described. FIG. 5 is a pattern diagram showing the maximum load state of the spiral spring assembly of FIG. 4. When the central shaft 102 (i.e. the inner end 101b) is rotated in the direction indicated by the black-outlined arrow in FIG. 4, the minimum load state shifts to the maximum load state.

As shown in FIG. 5, in the maximum load state, torque Min is generated in the inner end 101b in accordance with the rotation of the central shaft 102. Further, torque Mout is generated in the outer end 101a in an opposite direction to the torque Min. Note, however, that no load is generated in the inner end 101b. The reason for this is that the load Fin (see FIG. 2) corresponding to the tightening amount δ0 is canceled out by the load Fin (see FIG. 4) in the minimum load state. Also, the load Fout (see FIG. 2) corresponding to the tightening amount δ0 is canceled out by the load Fout (see FIG. 4) in the minimum load state. Hence, when the diametrical direction displacement amount (excluding the winding shift amount δ2) of the outer end is set as the tightening amount of the outer end, no load is generated in the inner end in the maximum load state.

(2) Method of Generating a Diametrical Direction Load in the Inner End in the Maximum Load State This method is employed to adjust the diametrical direction displacement amount of the outer end using the method described above in (1) as a reference. First, the pre-setting state of the spiral spring assembly used in this method will be described. FIG. 6 is a pattern diagram showing the spiral spring assembly in the pre-setting state in a case where a diametrical direction load is generated in the inner end. As shown in FIG. 6, the outer end 101a is shifted substantially in parallel in the inner diametrical direction by a correction amount δ relative to the position of the outer end 101a after being shifted substantially in parallel in the outer diametrical direction by the total shift amount δ1 (see FIG. 3).

Next, the minimum load state of the spiral spring assembly used in this method will be described. FIG. 7 is a pattern diagram showing the minimum load state of the spiral spring assembly of FIG. 6. As shown in FIG. 7, the outer end 101a is fixed to the outer end fixing member 103 after being elastically deformed in the inner diametrical direction by a tightening amount δ0−δ. As a result, an outer diametrical direction load Fout-v (which is smaller than the load Fout shown in FIG. 4) is generated in the outer end 101a. Further, a load Fin-v (which is smaller than the load Fin shown in FIG. 4) is generated in the inner end 101b in an opposite direction to the load Fout-v. Also, clockwise direction torque Min is generated in the inner end 101b. Further, counter-clockwise direction torque Mout is generated in the outer end 101a.

Figure 8:
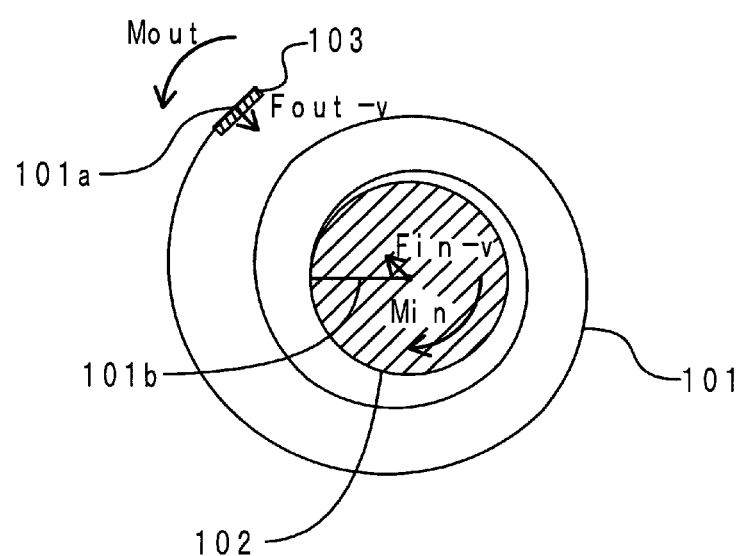
FIG. 8 is a pattern diagram showing the maximum load state of the spiral spring assembly of FIG. 7.

Next, the maximum load state of the spiral spring assembly used in this method will be described. FIG. 8 is a pattern diagram showing the maximum load state of the spiral spring assembly of FIG. 7. When the central shaft 102 (i.e. the inner end 101b) is rotated in the direction indicated by the black-outlined arrow in FIG. 7, the minimum load state switches to the maximum load state.

As shown in FIG. 8, in the maximum load state, torque Min is generated in the inner end 101b. Further, torque Mout is generated in the outer end 101a in an opposite direction to the torque Min. Also, a load Fout-v produced by the difference between the load Fout-v (see FIG. 7) and the load Fout (see FIG. 4) is generated in the outer end 101a. Further, a load Fin-v produced by the difference between the load Fin-v (see FIG. 7) and the load Fin (see FIG. 4) is generated in the inner end 101b.

Hence, when the diametrical direction displacement amount (excluding the winding shift amount δ2) of the outer end in the pre-setting state is set to be less than the tightening amount of the outer end, an outer end direction load is generated in the inner end in the maximum load state. On the other hand, when the diametrical direction displacement amount (excluding the winding shift amount δ2) of the outer end in the pre-setting state is set to exceed the tightening amount of the outer end, a load is generated in the inner end in an opposite direction to the outer end direction in the maximum load state.

Figure 9:
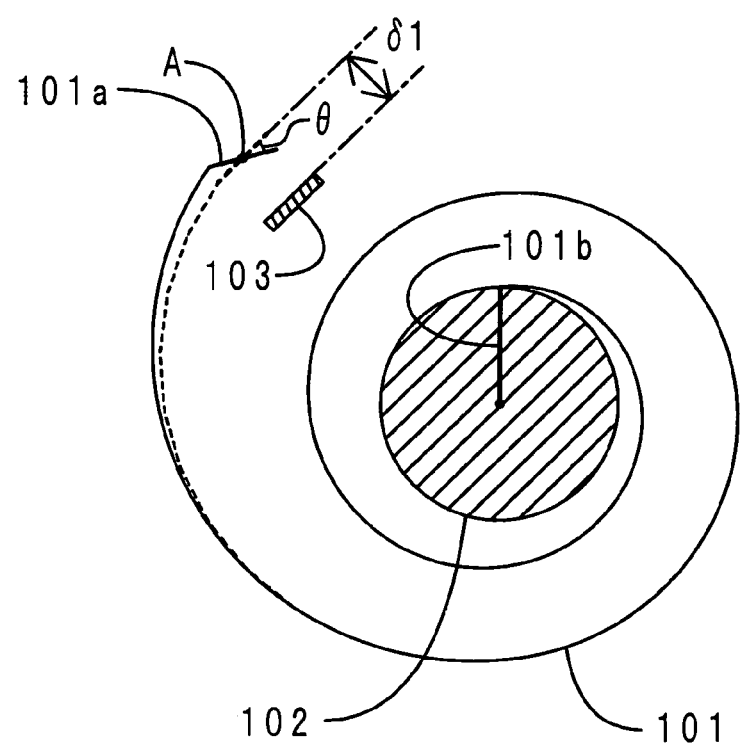
FIG. 9 is a pattern diagram showing the spiral spring assembly in the pre-setting state in a case where an orthogonal direction load is generated in the inner end.

(3) Method of Generating an Orthogonal Direction Load in the Inner End in the Maximum Load State This method is employed to adjust the angle of the outer end using the method described above in (1) as a reference. First, the pre-setting state of the spiral spring assembly used in this method will be described. FIG. 9 is a pattern diagram showing the spiral spring assembly in the pre-setting state in a case where an orthogonal direction load is generated in the inner end. As shown in FIG. 9, the outer end 101a is bent (rotated) in the inner diametrical direction about a center A of an extension direction of the outer end 101a by an angle θ relative to the position of the outer end 101a after being shifted substantially in parallel in the outer diametrical direction by the total shift amount δ1 (see FIG. 3).

Figure 10:
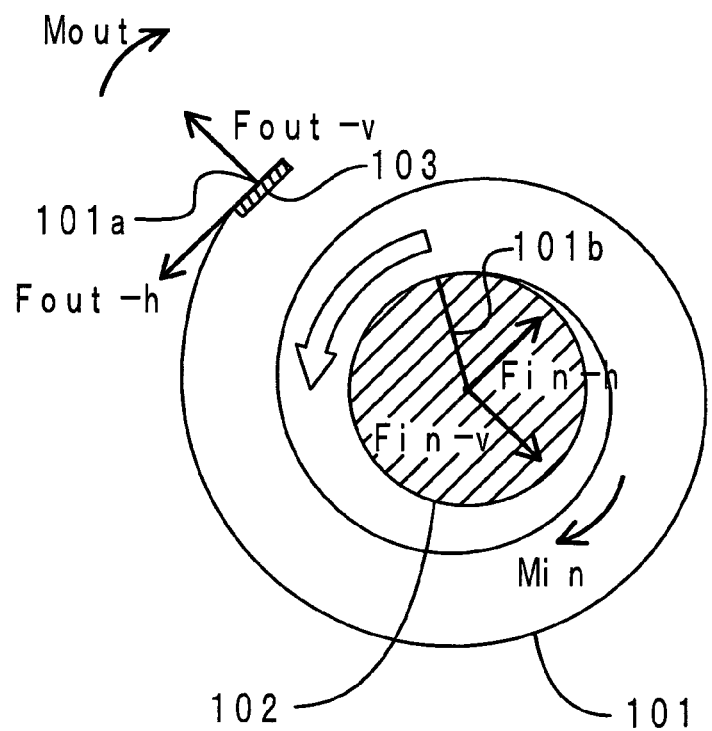
FIG. 10 is a pattern diagram showing the minimum load state of the spiral spring assembly of FIG. 9.

Next, the minimum load state of the spiral spring assembly used in this method will be described. FIG. 10 is a pattern diagram showing the minimum load state of the spiral spring assembly of FIG. 9. As shown in FIG. 10, the outer end 101a is fixed to the outer end fixing member 103 after being elastically deformed in the outer diametrical direction by the angle θ and in the inner diametrical direction by the tightening amount δ0. As a result of rotation of the inner end 101b when shifting from the pre-setting state to the minimum load state and the angle θ shown in FIG. 9, bending torque Mout is generated in the outer end 101a. The bending torque Mout corresponds to the difference between the clockwise direction torque generated by the angle θ of FIG. 9 and the counterclockwise direction torque generated by rotation of the inner end 101b (see FIG. 7). Further, torque Min is generated in the inner end 101b by the rotation. Also, a load Fout-h and a load Fin-h are generated in the outer end 101a and the inner end 101b, respectively.

In addition, an outer diametrical direction load Fout-v (corresponding to the load Fout shown in FIG. 4) is generated in the outer end 101a by the tightening amount 80. Also, a load Fin-v (corresponding to the load Fin shown in FIG. 4) is generated in the inner end 101b in an opposite direction to the load Fout-v.

Next, the maximum load state of the spiral spring assembly used in this method will be described. FIG. 11 is a pattern diagram showing the maximum load state of the spiral spring assembly of FIG. 10. When the central shaft 102 (i.e. the inner end 101b) is rotated in the direction indicated by the black-outlined arrow in FIG. 10, the minimum load state switches to the maximum load state.

As shown in FIG. 11, in the maximum load state, torque Mout produced by the difference between the torque Mout (see FIG. 5) and the bending torque Mout (see FIG. 10) is generated in the outer end 101a. Here, the torque Mout is smaller than the torque Mout (see FIG. 5) by the bending torque Mout (see FIG. 10). Accordingly, torque Min is generated in the inner end 101b to counterbalance the load Fout-h and the torque Mout acting on the outer end 101a. Further, a load Fin-h is generated in the inner end 101b.

The load Fout-v (see FIG. 10) in the minimum load state cancels out the load Fout (see FIG. 2) corresponding to the tightening amount δ0. Further, the load Fin-v (see FIG. 10) in the minimum load state cancels out the load Fin (see FIG. 2) corresponding to the tightening amount 80. Therefore, no load is generated in the outer end 101a in an orthogonal direction to the load Fout-h. Also, no load is generated in the inner end 101b in an orthogonal direction to the load Fin-h.

Hence, when the outer end is bent (rotated) in the inner diametrical direction in the pre-setting state, a load is generated in the inner end in the maximum load state in a substantially parallel direction to the extension direction of the outer end (i.e. an orthogonal direction) and an opposite direction to the direction of the load generated in the outer end. Note that when the outer end is bent (rotated) in the outer diametrical direction in the pre-setting state, a load is generated in the inner end in an opposite direction to the direction of the load Fin-h shown in FIG. 11. Embodiments of the spiral spring assembly employing the above outer/inner end load control methods will now be described.

FIRST EMBODIMENT

Figure 12:
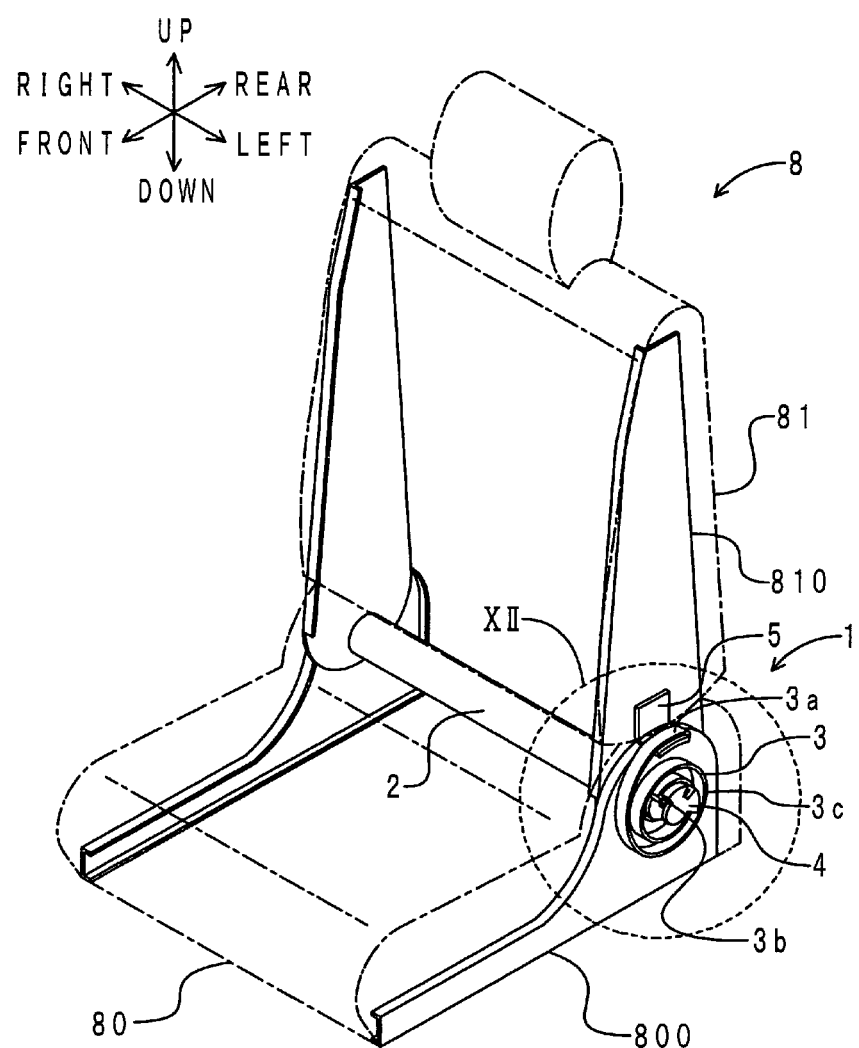
FIG. 12 is a transparent perspective view of a seat into which a spiral spring assembly according to a first embodiment is incorporated.

First, the constitution of a seat into which a spiral spring assembly according to this embodiment is incorporated will be described. FIG. 12 is a transparent perspective view of a seat into which the spiral spring assembly according to this embodiment is incorporated. Note that the left and right sides of the drawing are defined using the rear-front direction of the vehicle as a reference.

As shown in FIG. 12, a seat 8 includes a seat cushion 80 (indicated by a dot-dash line for ease of description) and a seat back 81 (indicated by a dot-dash line for ease of description). The seat cushion 80 includes a plate-form cushion frame 800 made of steel. The cushion frame 800 is disposed in a left-right pair. The cushion frame 800 is fixed to a vehicle floor (not shown) via a seat sliding mechanism (not shown).

The seat back 81 includes a steel back frame 810. The back frame 810 is disposed in a left-right pair. The pair of back frames are connected by a steel connecting rod (not shown). A lower end of the back frame 810 and a rear end of the cushion frame 800 are connected by a shaft 2, to be described below, so as to be capable of oscillating. In other words, the seat back 81 is capable of oscillating in a front-rear direction relative to the seat cushion 80 about the shaft 2.

Next, the constitution of the spiral spring assembly according to this embodiment will be described. A spiral spring assembly 1 of this embodiment is disposed on each of the left and right sides of the seat 8 to make a total of two spiral spring assemblies 1. The two spiral spring assemblies 1 are structured identically. Therefore, only the constitution of the left side spiral spring assembly 1 will be described here, and description of the right side spiral spring assembly 1 will be omitted. The spiral spring assembly 1 includes the shaft 2, a non-contact spiral spring 3, an inner end fixing member 4, and an outer end fixing member 5.

The shaft 2 is made of steel and takes the form of a round bar. The shaft 2 is included in the central shaft of the present invention. The shaft 2 connects the lower end of the back frame 810 and the rear end of the cushion frame 800 to enable relative oscillation therebetween. The left and right ends (the two axial ends) of the shaft 2 project from an outer surface of the cushion frame 800.

Figure 13:
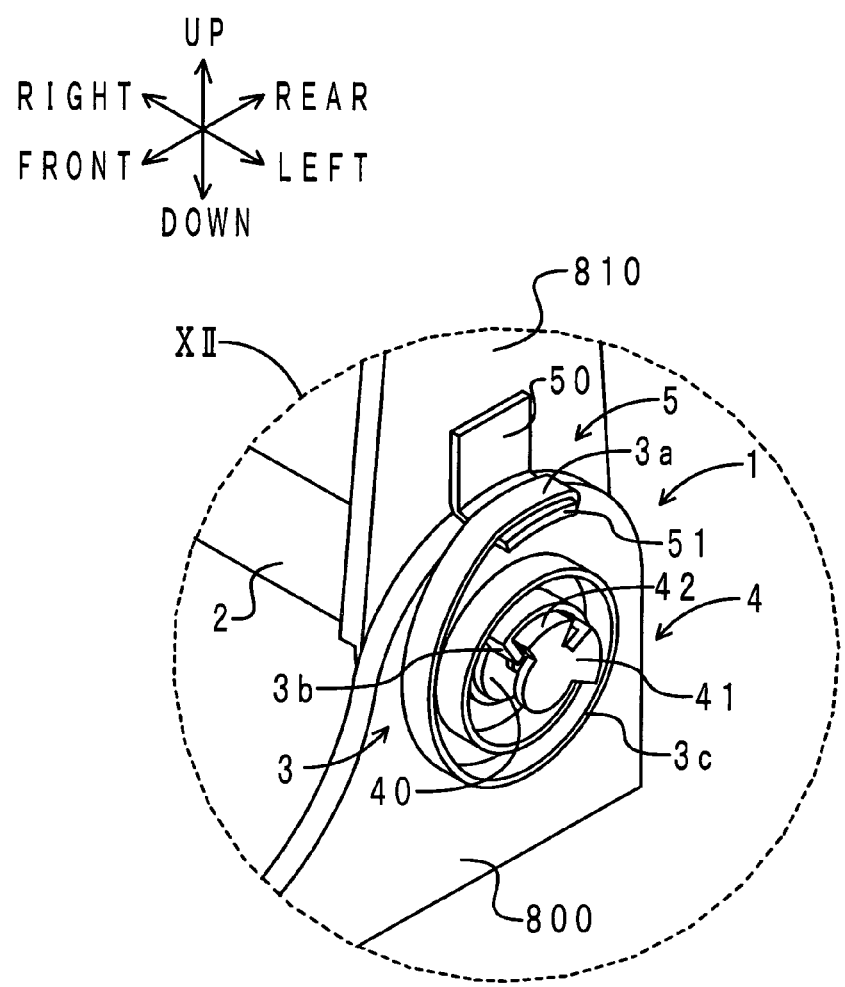
FIG. 13 is an enlarged view of the interior of a circle XII in FIG. 12.
Figure 14:
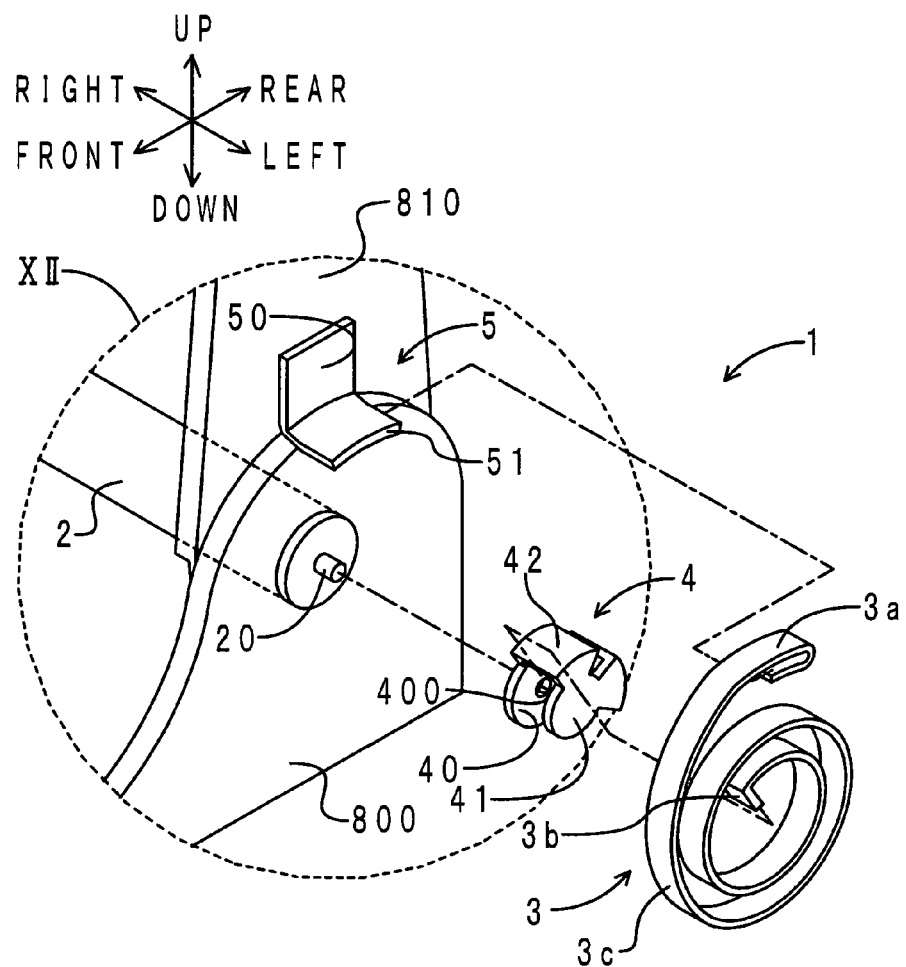
FIG. 14 is an exploded perspective view of FIG. 13.

The inner end fixing member 4 is disposed on the left and right ends of the shaft 2. FIG. 13 is an enlarged view of the interior of a circle XII in FIG. 12. FIG. 14 is an exploded perspective view of FIG. 13. As shown in these drawings, the inner end fixing member 4 is made of steel, and has an inside circular plate portion 40, an outside circular plate portion 41, and a bridge portion 42. A pin hole 400 is pierced through the center of the inside circular plate portion 40. Meanwhile, a pin 20 projects from the left side axial end of the shaft 2. The pin 20 is inserted into the pin hole 400 and thereby fixed. The outside circular plate portion 41 is disposed on the left side of the inside circular plate portion 40. The bridge portion 42 takes a C shape. The two ends of the C shape of the bridge portion 42 are each connected to the outside circular plate portion 41 and the inside circular plate portion 40. In other words, the bridge portion 42 connects the outside circular plate portion 41 and the inside circular plate portion 40 to each other.

The outer end fixing member 5 is made of steel and takes an L shape. More specifically, the outer end fixing member 5 includes a base portion 50 and an outer end fixing portion 51. The base portion 50 takes a plate form and is welded to the back frame 810. The outer end fixing portion 51 takes a plate form and projects in a leftward direction from the base portion 50.

The non-contact spiral spring 3 is made of spring steel, and includes an outer end 3a, an inner end 3b, and a spiral portion 3c. The outer end 3a takes a U shape bent in an inner diametrical direction. The outer end 3a is fixed to the outer end fixing portion 51 of the outer end fixing member 5. In more detail, the plate-form outer end fixing portion 51 is inserted into the interior of the U shape of the outer end 3a with a predetermined clearance secured therebetween. Therefore, even when the non-contact spiral spring 3 tightens, the outer end 3a is only capable of moving relative to the outer end fixing member 5 by an amount corresponding to the clearance. Thus, the outer end 3a is capable of transmitting torque to the outer end fixing member 5.

The inner end 3b takes an L shape bent in a spiral center direction. The inner end 3b is latched to the bridge portion 42 of the inner end fixing member 4. The inner end 3b is capable of transmitting torque to the inner end fixing member 4, or in other words to the shaft 2.

The spiral portion 3c connects the outer end 3a to the inner end 3b in spiral form. In the pre-setting state, a part of the spiral portion 3c other than a predetermined section from the outer end 3a substantially takes the form of an Archimedes spiral.

When an operator tilts the seat back 81 rearward, the outer end fixing member 5 fixed to the back frame 810 also tilts rearward. On the other hand, the shaft 2, or in other words the inner end fixing member 4, does not spin. Therefore, the outer end 3a of the non-contact spiral spring 3 moves rearward relative to the inner end 3b. In other words, the non-contact spiral spring 3 tightens. As a result of this tightening, elastic energy accumulates in the non-contact spiral spring 3. As a result of this elastic energy, the seat back 81 is biased in a forward tilting direction.

Note that a ratchet mechanism (not shown) is interposed between the lower end of the back frame 810 and the rear end of the cushion frame 800 on the right side of the seat 8. The ratchet mechanism includes a ratchet, a pole, and an operating lever. When the operator pulls the operating lever, the pole is released from the ratchet. Thus, the operator can modify the angle of the seat back 81 using the elastic energy of the non-contact spiral spring 3. Conversely, when the operator returns the operating lever, the pole is latched to the ratchet. Thus, the operator can fix the angle of the seat back 81.

Next, the movement of the spiral spring assembly according to this embodiment during a seat operation will be described. The seat back 81 is biased forward by the biasing force of the non-contact spiral spring 3. The seat back 81 is capable of oscillating about the shaft 2 within the range of an operating section from a minimum load state, in which a gripping angle between the seat back 81 and the seat cushion 80 is at a minimum, and a maximum load state in which the gripping angle is at a maximum.

Figure 15:
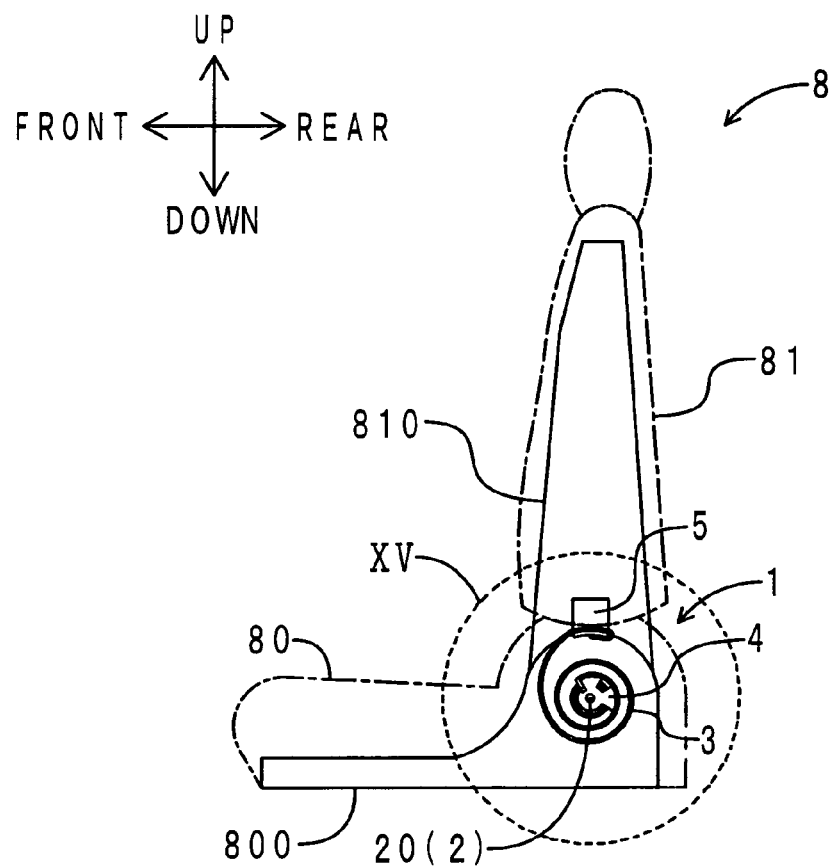
FIG. 15 is a transparent side view of the seat into which the spiral spring assembly according to the first embodiment is incorporated in the minimum load state.
Figure 16:
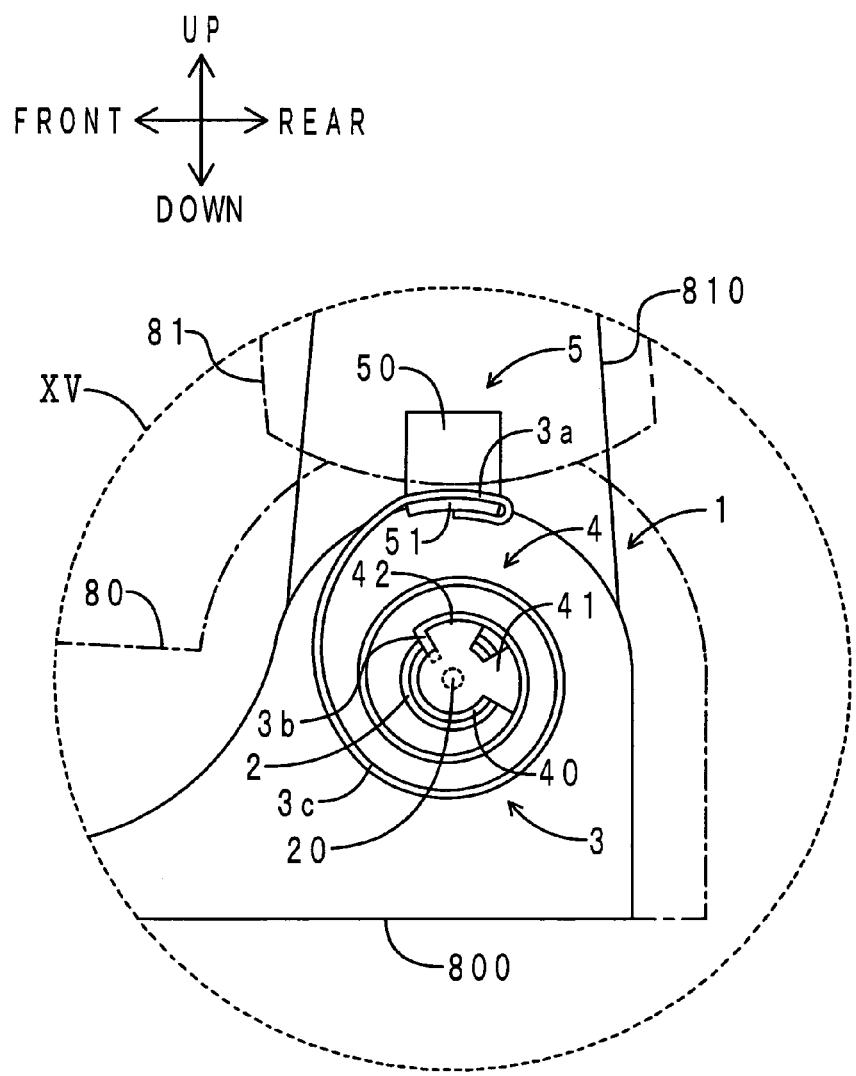
FIG. 16 is an enlarged view of the interior of a circle XV in FIG. 15.

First, the minimum load state will be described. FIG. 15 is a transparent side view showing the minimum load state of the seat into which the spiral spring assembly according to this embodiment is incorporated. FIG. 16 is an enlarged view of the interior of a circle XV in FIG. 15. Note that in these drawings, the seat cushion 80 and seat back 81 are indicated by dot-dash lines.

As shown in these drawings, the gripping angle between the cushion frame 800 and the back frame 810 in the minimum load state is substantially 90°. Further, the outer end fixing member 5 is disposed substantially directly above the inner end fixing member 4, i.e. the shaft 2. In other words, the outer end 3a is disposed substantially directly above the inner end 3b. In the minimum load state, the gripping angle between the cushion frame 800 and the back frame 810 is maintained by the aforementioned ratchet mechanism while securing a slight elastic energy in the non-contact spiral spring 3. In other words, the back frame 810 is fixed while being biased slightly forward by the biasing force of the non-contact spiral spring 3.

Figure 17:
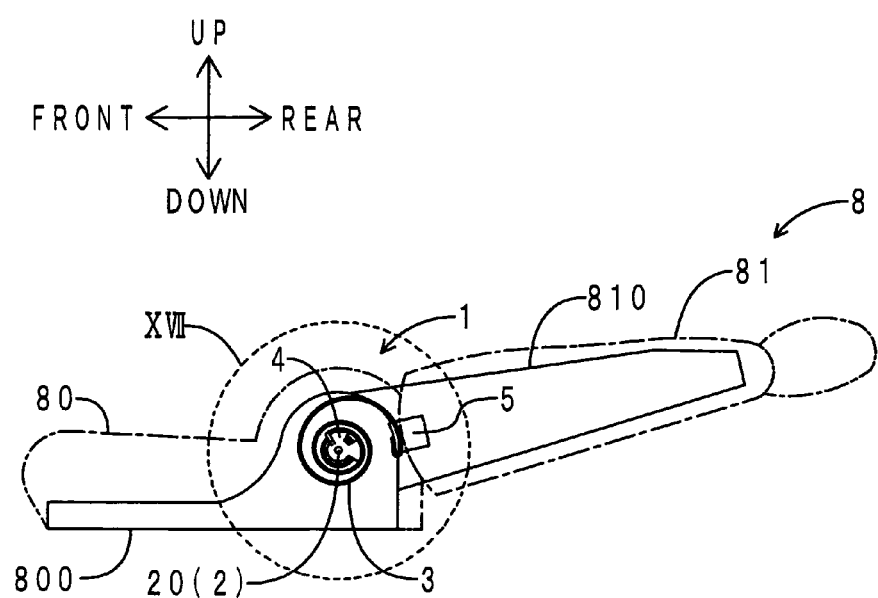
FIG. 17 is a transparent side view of the seat into which the spiral spring assembly according to the first embodiment is incorporated in the maximum load state.
Figure 18:
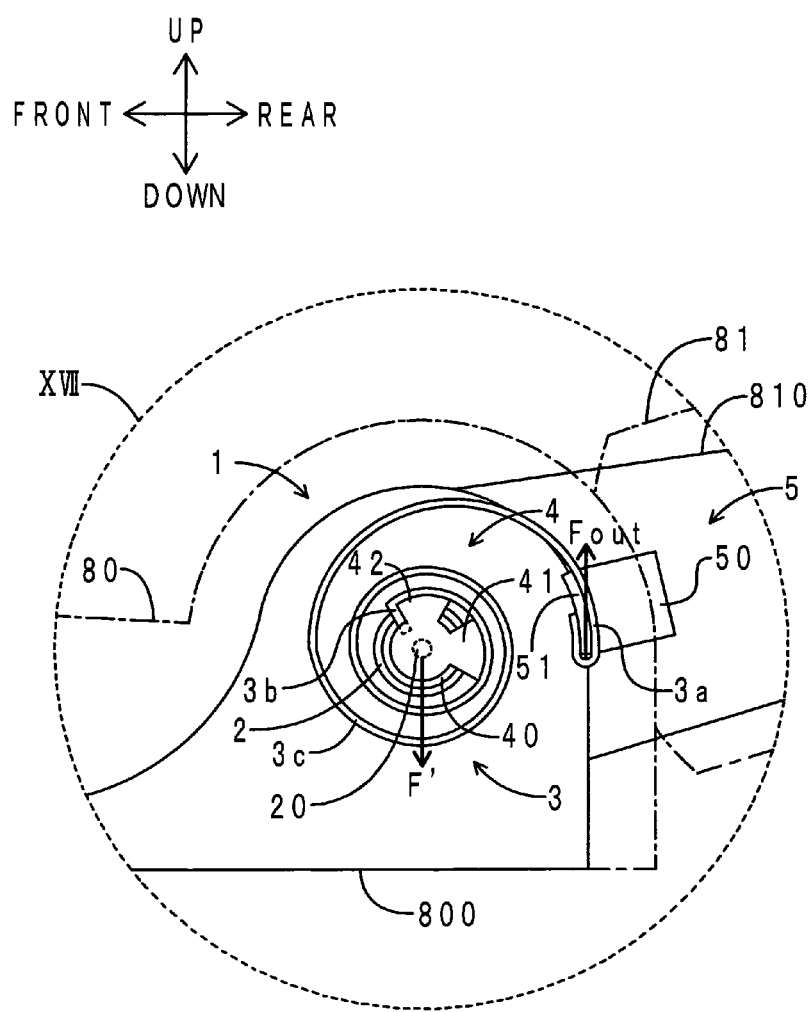
FIG. 18 is an enlarged view of the interior of a circle XVII in FIG. 17.

Next, the maximum load state will be described. To switch from the minimum load state to the maximum load state, the operator tilts the seat back 81 rearward against the biasing force of the non-contact spiral spring 3 while pulling the operating lever. FIG. 17 is a transparent side view showing the maximum load state of the seat into which the spiral spring assembly according to this embodiment is incorporated. FIG. 18 is an enlarged view of the interior of a circle XVII in FIG. 17. Note that in these drawings, the seat cushion 80 and seat back 81 are indicated by dot-dash lines.

As shown in these drawings, the gripping angle between the cushion frame 800 and the back frame 810 in the maximum load state is substantially 165°. Further, the outer end fixing member 5 has moved to the rear of the inner end fixing member 4, i.e. the shaft 2. In other words, the outer end 3a has moved to the rear of the inner end 3b. In the maximum load state, the gripping angle between the cushion frame 800 and the back frame 810 is maintained by the aforementioned ratchet mechanism in a state where a maximum amount of elastic energy is stored in the non-contact spiral spring 3.

Incidentally, in the maximum load state, a downward direction lateral force F' acts on the shaft 2 from the back frame 810 due to the weight of the seat back 81. Meanwhile, the outer end 3a applies an upward direction load Fout to the shaft 2 via the outer end fixing member 5 and the back frame 810 by means of a fixing mechanism for fixing the outer end 3a to the outer end fixing member 5, to be described below. Here, the magnitude of the load Fout is set to be capable of canceling out the lateral force F'. Therefore, the lateral force that is applied to the shaft 2 in the maximum load state (the resulting force of the load Fout and the lateral force F') becomes substantially 0.

Figure 19:
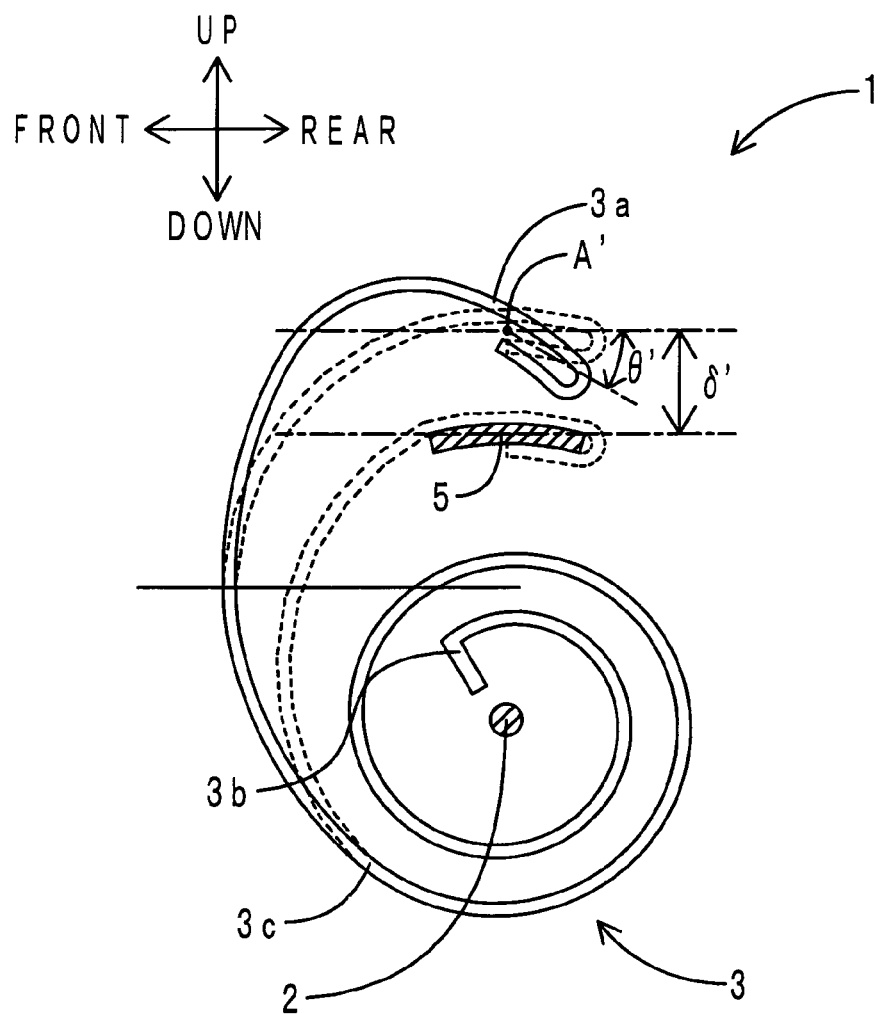
FIG. 19 is a pattern diagram showing the spiral spring assembly according to the first embodiment in the pre-setting state.

Next, the fixing mechanism for fixing the outer end 3a to the outer end fixing member 5 in the spiral spring assembly according to this embodiment will be described. FIG. 19 is a pattern diagram showing the pre-setting state of the spiral spring assembly according to this embodiment. Note that for ease of description, the shaft 2 and the outer end fixing member 5 are shaded. Further, the dot-dash line in FIG. 19 indicates the extension direction of the outer end 3a (the tangential direction of the outer end 3a).

As shown in FIG. 19, the outer end 3a is shifted substantially in parallel in the outer diametrical direction by a correction amount δ' in comparison with a set state (i.e. the minimum load state), in which the non-contact spiral spring 3 is attached to the inner end fixing member (shaft 2) and the outer end fixing member 5. The diametrical direction load generated in the outer end 3a is adjusted by the correction amount δ' (see FIGS. 6 to 8). Further, the outer end 3a is bent (rotated) in the inner diametrical direction about a center A' of the extension direction (tangential direction) of the outer end 3a by an angle θ' in comparison with the set state. The tangential direction load generated in the outer end 3a is adjusted by the angle θ' (see FIGS. 9 to 11).

Note that the non-contact spiral spring 3 is manufactured by applying the shape described above to one lengthwise direction end (the end that is to become the outer end 3a) of a spring steel strip having a predetermined length, then inserting the other lengthwise direction end (the end that is to become the inner end 3b) into a slit of a mandrel (not shown), and then rotating the mandrel in this state.

When attaching the non-contact spiral spring 3 to the inner end fixing member (shaft 2) and the outer end fixing member 5, first the inner end 3b is fixed to the inner end fixing member.

Next, the outer end 3a is fixed to the outer end fixing member 5 by pushing the outer end 3a precisely in the inner diametrical direction. As a result, the non-contact spiral spring 3 is attached. When the non-contact spiral spring 3 is attached in this manner, the load Fout shown in FIG. 18 is generated in the maximum load state.

Next, actions and effects of the spiral spring assembly according to this embodiment will be described. According to the spiral spring assembly 1 of this embodiment, the outer end 3a is fixed to the outer end fixing member 5 so as to be capable of transmitting torque. Further, in the pre-setting state, the outer end 3a is shifted substantially in parallel in the outer diametrical direction by the correction amount δ' and bent in the inner diametrical direction about the center A' by the angle θ' in comparison with the minimum load state. Hence, in the maximum load state, the load Fout is generated in the outer end 3a, and the lateral force F' generated in the shaft 2 can be canceled out by the load Fout.

Further, according to the spiral spring assembly 1 of this embodiment, the magnitude and direction of the load that is generated in the outer end 3a (the resulting force of the diametrical direction load and the tangential direction load) can be controlled freely by adjusting the correction amount δ' and the angle θ'. Therefore, it is possible to respond freely to cases in which the direction of the lateral force F' is not the downward direction (for example, when a load generated by contact between the seat back 81 and the seat cushion 80 or the like, in addition to the weight of the seat back 81, acts as lateral force), for example.

Further, according to the spiral spring assembly 1 of this embodiment, the non-contact spiral spring 3 is used as the spiral spring of the present invention. Hence, there is little need to take the effects of wire contact into account when setting the load Fout (when determining the correction amount δ' and the angle θ' of the outer end 3a). Accordingly, the load Fout can be controlled more precisely.

Further, according to the spiral spring assembly 1 of this embodiment, the outer end fixing portion 51 is inserted into the U-shaped interior of the outer end 3a with a predetermined clearance. Therefore, the attachment operation is simple.

SECOND EMBODIMENT

A spiral spring assembly according to this embodiment differs from the spiral spring assembly of the first embodiment in that the outer end fixing member is constituted by a pair of pins. Further, the inner end fixing member and the shaft are formed integrally. Also in the pre-setting state, the pitch of the spiral portion is set at an unequal pitch. These differences will now be described.

Figure 20:
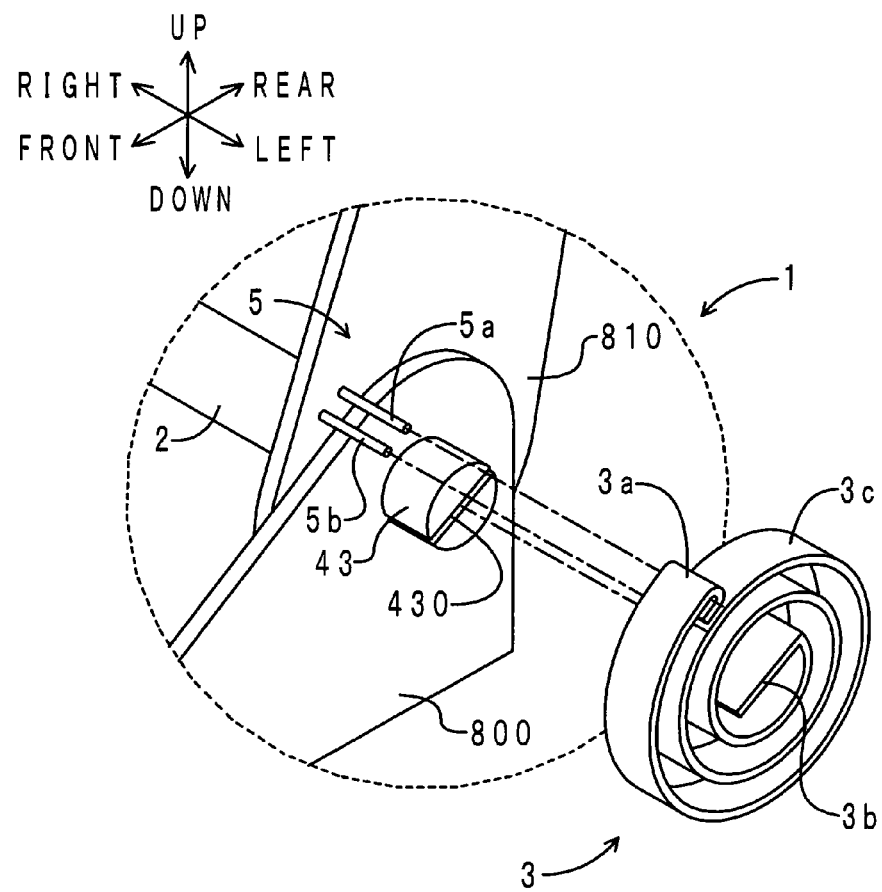
FIG. 20 is an exploded perspective view of a spiral spring assembly according to a second embodiment.

FIG. 20 is an exploded perspective view of the spiral spring assembly according to this embodiment. Note that sites corresponding to FIG. 14 are indicated using identical reference symbols. As shown in FIG. 20, the outer end fixing member 5 is constituted by a pair of outer end fixing pins 5a, 5b. The outer end fixing pins 5a, 5b are made of steel, and each takes the form of a round bar. The outer end fixing pins 5a, 5b are welded to the back frame 810 so as to be separated by a predetermined interval. The bottom portion of the U shape of the outer end 3a is fixed to the outer end fixing pin 5a, while one end portion (the end portion that forms a continuation of the spiral portion 3c) of the U shape of the outer end 3a is fixed to the outer end fixing pin 5b.

An inner end fixing portion 43 is formed on the end of the shaft 2 that projects from the cushion frame 800. The inner end fixing portion 43 is included in the inner end fixing member of the present invention. A slit 430 that extends in a diametrical direction is provided as a recess in an end surface of the inner end fixing portion 43. The plate-form inner end 3b is inserted into the slit 430 and thereby fixed.

Figure 21:
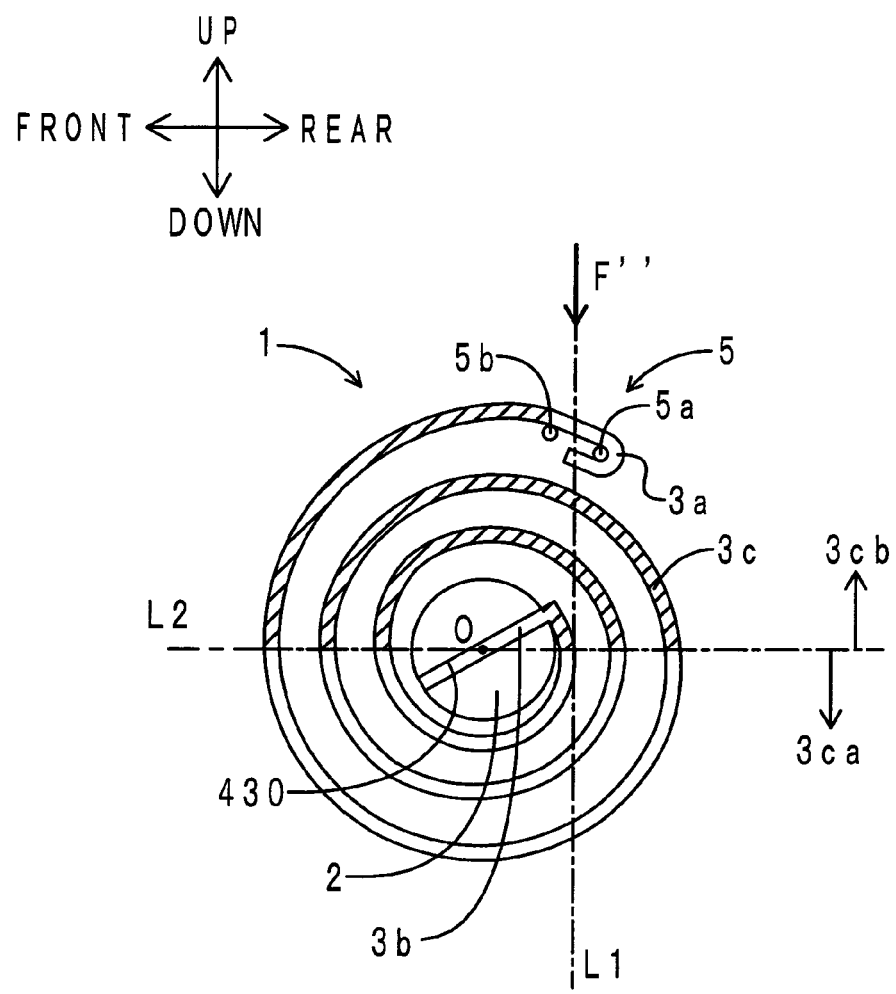
FIG. 21 is a side view showing the maximum load state of the spiral spring assembly according to the second embodiment.

FIG. 21 is a side view showing the maximum load state of the spiral spring assembly according to this embodiment. As shown in FIG. 21, a downward load F''' is generated in the outer end 3a from the outer end fixing member 5 in the maximum load state. A boundary line L2 extends in a substantially perpendicular direction to a direction L1 of the load F'''. Further, the boundary line L2 passes through an axial center O of the shaft 2. The spiral portion 3c is divided vertically into a load side section 3ca (the part below the boundary line L2) and an anti-load side section 3cb (the part above the boundary line L2, which is shaded for ease of description) by the boundary line L2.

Figure 22:
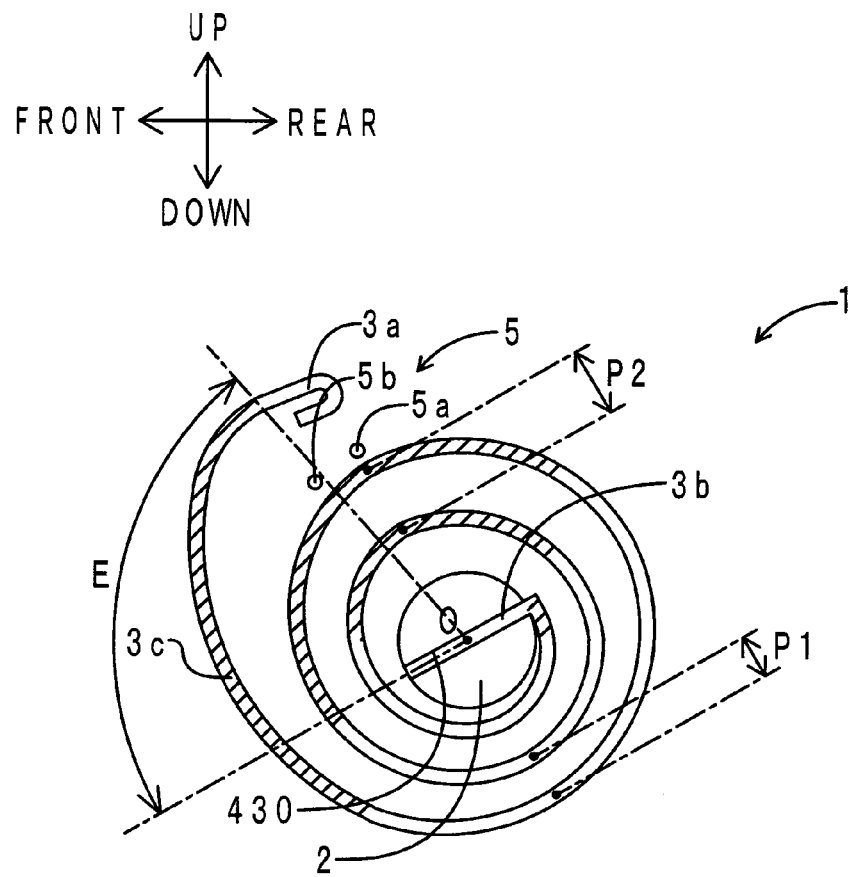
FIG. 22 is a side view showing the pre-setting state of the spiral spring assembly according to the second embodiment.

FIG. 22 is a side view showing the pre-setting state of the spiral spring assembly according to this embodiment. As shown in FIG. 22, in the pre-setting state, the spiral portion 3c, which is wound tight in the maximum load state, returns to a natural length state. Therefore, the positions of the load side section 3ca and anti-load side section 3cb also change. A pitch P2 is an inter-wire distance between the spring wires (more specifically, between the diametrical direction centers of the spring wires) of the anti-load side section 3cb. A pitch P1 is an inter-wire distance between the spring wires (more specifically, between the diametrical direction centers of the spring wires) of the load side section 3ca. Excluding an outer end connecting part E, the average value of the pitch P2 is set to be larger than the average value of the pitch P1.

The spiral spring assembly 1 of this embodiment exhibits similar actions and effects to the spiral spring assembly of the first embodiment. Furthermore, in the maximum load state, the inter-wire distance of the anti-load side section 3cb is more likely to be smaller than the inter-wire distance of the load side section 3ca due to the load F''' acting on the outer end 3a.

If wire contact occurs in the spiral portion 3c, initial release torque generated when the maximum load state is released decreases rapidly due to wire friction. As a result, the responsiveness of the spiral spring assembly 1 deteriorates.

According to the spiral spring assembly 1 of this embodiment, however, the average value of the pitch P2 of the parts constituting the anti-load side section 3cb is set in advance to be larger than the average value of the pitch P1 of the parts constituting the load side section 3ca in the pre-setting state. Therefore, in the maximum load state, there is little danger of the parts constituting the anti-load side section 3cb coming into contact with each other. Accordingly, the initial release torque generated when releasing the maximum load state is unlikely to decrease rapidly as a result of wire friction.

Further, according to the spiral spring assembly 1 of this embodiment, the outer end fixing member 5 is constituted by the pair of outer end fixing pins 5a, 5b. Therefore, the installation cost of the outer end fixing member 5, and accordingly the manufacturing cost of the spiral spring assembly 1, can be reduced.

THIRD EMBODIMENT

Figure 23:
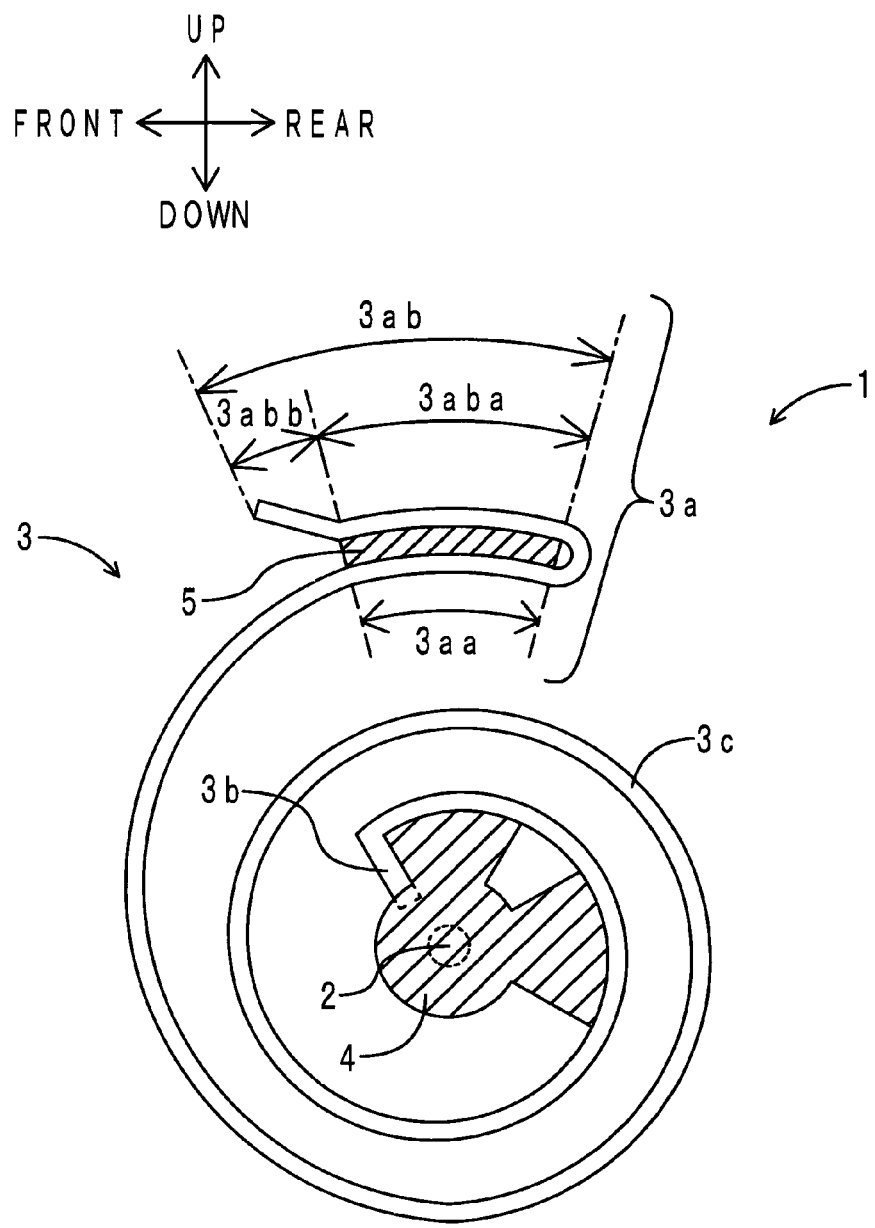
FIG. 23 is a pattern side view showing the minimum load state of a spiral spring assembly according to a third embodiment.

A spiral spring assembly according to this embodiment differs from the spiral spring assembly of the first embodiment only in the shape of the outer end. This difference will now be described. FIG. 23 is a pattern side view showing the minimum load state of the spiral spring assembly according to this embodiment. Note that parts corresponding to FIG. 16 are indicated using identical reference symbols.

As shown in FIG. 23, the outer end 3a takes a U shape having an inner diameter side wall portion 3aa and an outer diameter side wall portion 3ab. The inner diameter side wall portion 3aa is formed as a continuation of the spiral portion 3c. On the other hand, the outer diameter side wall portion 3ab is open. The outer diameter side wall portion 3ab includes a fixing portion 3aba and an introduction portion 3abb. The introduction portion 3abb is bent in the outer diametrical direction relative to the extension direction of the fixing portion 3aba. In the minimum load state, the outer end fixing member 5 is gripped by the fixing portion 3aba of the outer diameter side wall portion 3ab and the inner diameter side wall portion 3aa, and thereby fixed.

Figure 24:
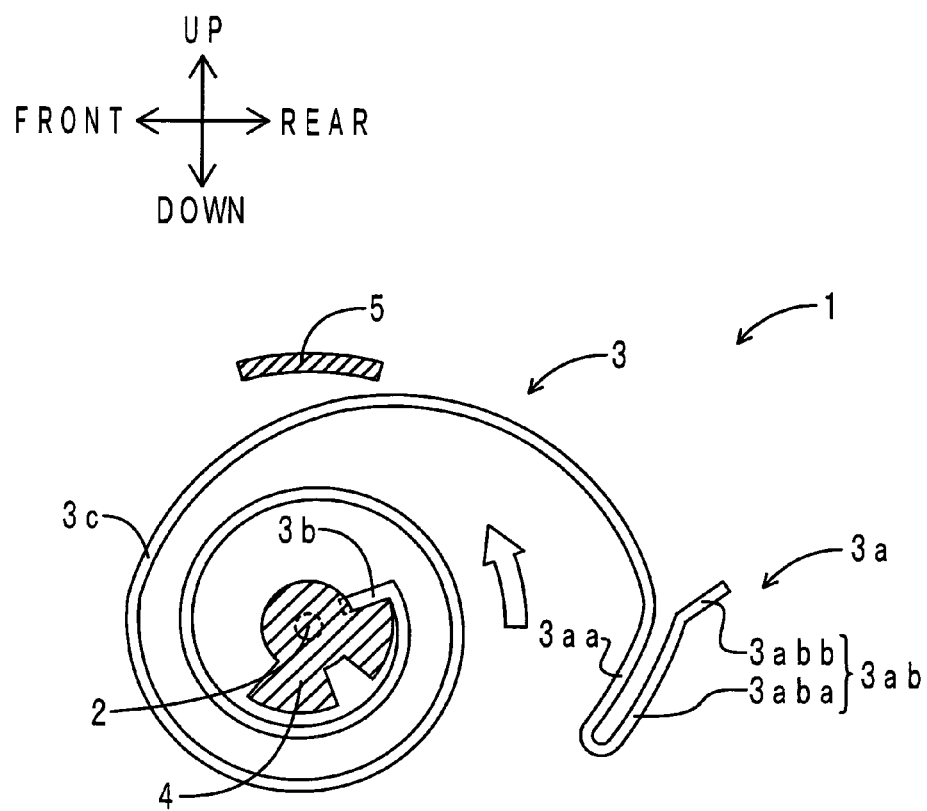
FIG. 24 is a pattern side view showing a first step of a method for assembling the spiral spring assembly according to the third embodiment.

A method of attaching the non-contact spiral spring 3 to the outer end fixing member 5 and the inner end fixing member 4 will now be described. This attachment method is constituted by a first step and a second step. In the first step, the inner end 3b is fixed to the inner end fixing member 4. FIG. 24 shows a pattern side view of the first step of the method of assembling the spiral spring assembly according to this embodiment. As shown in FIG. 24, in the first step, first the inner end 3b is latched to the inner end fixing member 4. Next, the outer end 3a is disposed to the rear of the outer end fixing member 5 such that the opening of the U shape of the outer end 3a faces the direction of the outer end fixing member 5.

Figure 25:
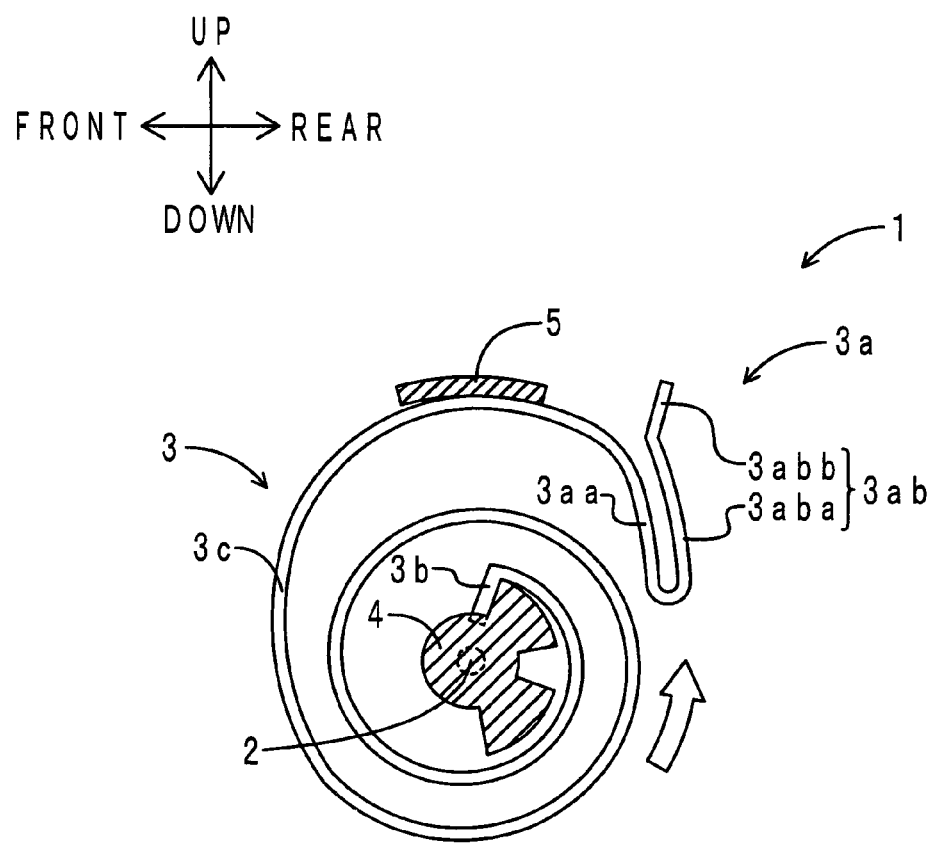
FIG. 25 is a pattern side view showing a second step of the method for assembling the spiral spring assembly according to the third embodiment.

In the second step, the outer end 3a of the non-contact spiral spring 3, the inner end 3b of which is already fixed, is fixed to the outer end fixing member 5 by rotating the non-contact spiral spring 3 about the inner end fixing member 4 (i.e. the shaft 2). FIG. 25 is a pattern side view showing the second step of the method of assembling the spiral spring assembly according to this embodiment. In this step, the non-contact spiral spring 3 is rotated in the counter-clockwise direction of the drawing. As a result of this rotation, the outer end 3a moves forward so as to approach the outer end fixing member 5.

Here, the radius of the outer end 3a and the part of the spiral portion 3c that is provided as a continuation of the outer end 3a is larger than the distance between the outer end fixing member 5 and the shaft 2, as shown in FIG. 24. Therefore, as shown in FIG. 25, when the non-contact spiral spring 3 is rotated, the part of the spiral portion 3a that is provided as a continuation of the outer end 3a contacts the outer end fixing member 5 slidingly from the inner diameter side. In other words, the spiral portion 3c jutting out in the outer diametrical direction is restricted by the outer end fixing member 5, and therefore rotates while being reduced in diameter. Furthermore, when the non-contact spiral spring 3 is rotated, the outer end fixing member 5 is inserted into an opening formed between the introduction portion 3abb and the inner diameter side wall portion 3aa. When the non-contact spiral spring 3 is rotated until the rear end portion of the outer end fixing member 5 reaches the bottom portion of the U shape of the outer end 3a, attachment of the non-contact spiral spring 3 is complete (the minimum load state shown in FIG. 23 is achieved).

The spiral spring assembly 1 according to this embodiment exhibits similar actions and effects to the spiral spring assembly of the first embodiment. Further, according to the spiral spring assembly 1 of this embodiment, the non-contact spiral spring 3 can be attached to the outer end fixing member 5 and the inner end fixing member 4 by means of a comparatively simple operation in which the inner end 3b is latched to the inner end fixing member 4 first, whereupon the non-contact spiral spring 3 is rotated. Hence, there is no need to push the spiral portion 3c and the outer end 3a, which jut out in the outer diametrical direction, in the inner diametrical direction in opposition to elastic force manually or using a special assembly machine. Therefore, the spiral spring assembly 1 according to this embodiment is superior in terms of ease of assembly.

Further, the introduction portion 3abb is disposed on the outer end 3a of the non-contact spiral spring 3. More specifically, the opening width of the U-shaped opening of the outer end 3a is widened by the introduction portion 3abb. As a result, the outer end fixing member 5 can be guided into the outer end 3a more easily.

Note that even when the radius of the outer end 3a and the part of the spiral portion 3c provided as a continuation of the outer end 3a is smaller than the distance between the outer end fixing member 5 and the shaft 2, the outer end fixing member 5 can be guided by the introduction portion 3abb by adjusting the length and angle of the introduction portion 3abb appropriately. In this case, the outer end 3a and the part of the spiral portion 3c provided as a continuation of the outer end 3a are restricted (pulled) by the outer end fixing member 5 from the outer diametrical direction, and therefore rotate while expanding in diameter.

FOURTH EMBODIMENT

A spiral spring assembly according to this embodiment differs from the spiral spring assembly of the first embodiment in that the inner end fixing member is not connected to the shaft. This difference will be described below.

Figure 26:
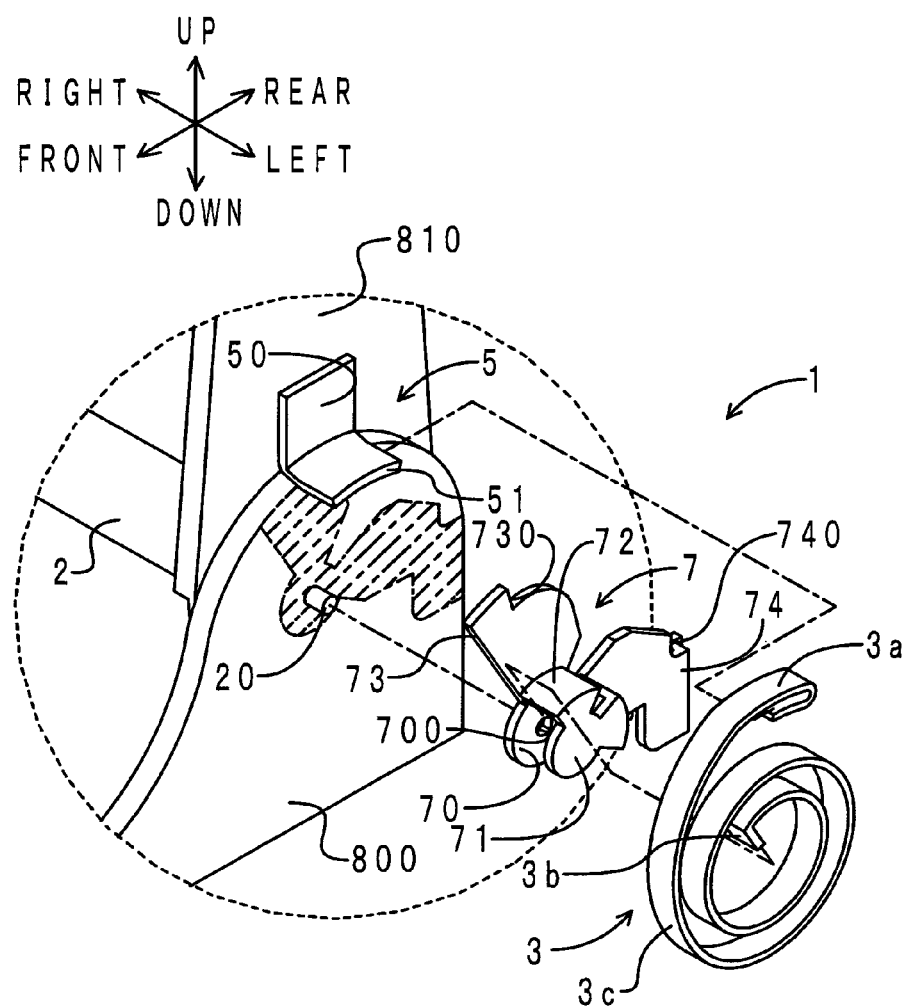
FIG. 26 is an exploded perspective view of a spiral spring assembly according to a fourth embodiment.

FIG. 26 is an exploded perspective view of the spiral spring assembly according to this embodiment. Note that sites corresponding to FIG. 14 have been allocated identical reference symbols. As shown in the drawing, an inner end fixing member 7 is made of steel, and includes an inside circular plate portion 70, an outside circular plate portion 71, a bridge portion 72, an upper wing portion 73, and a rear wing portion 74.

A pin hole 700 is pierced in the center of the inside circular plate portion 70. The pin 20 protrudes from the left side axial end of the shaft 2. The pin 20 is inserted into the pin hole 700. The pin 20 is capable of rotating (spinning) within the pin hole 700.

The upper wing portion 73 is disposed above the inside circular plate portion 70. A step 730 is formed on an upper edge of the upper wing portion 73. The rear wing portion 74 is disposed on the rear of the inside circular plate portion 70. A step 740 is formed on a rear edge of the rear wing portion 74. The back frame 810 is capable of oscillating about the shaft 2 between a minimum load state, in which the outer end fixing member 5 contacts the step 730, and a maximum load state, in which the outer end fixing member 5 contacts the step 740.

The outside circular plate portion 71 is disposed on the left side of the inside circular plate portion 70. The bridge portion 72 takes a C shape. The two ends of the C shape of the bridge portion 72 are each connected to the outside circular plate portion 71 and the inside circular plate portion 70. In other words, the bridge portion 72 connects the outside circular plate portion 71 and the inside circular plate portion 70 to each other. The inner end 3b of the non-contact spiral spring 3 is fixed to the bridge portion 72. As shown by the shading in the drawing, the inside circular plate portion 70, the upper wing portion 73, and the rear wing portion 74 are fixed to the cushion frame 800 by bolts (not shown).

Figure 27:
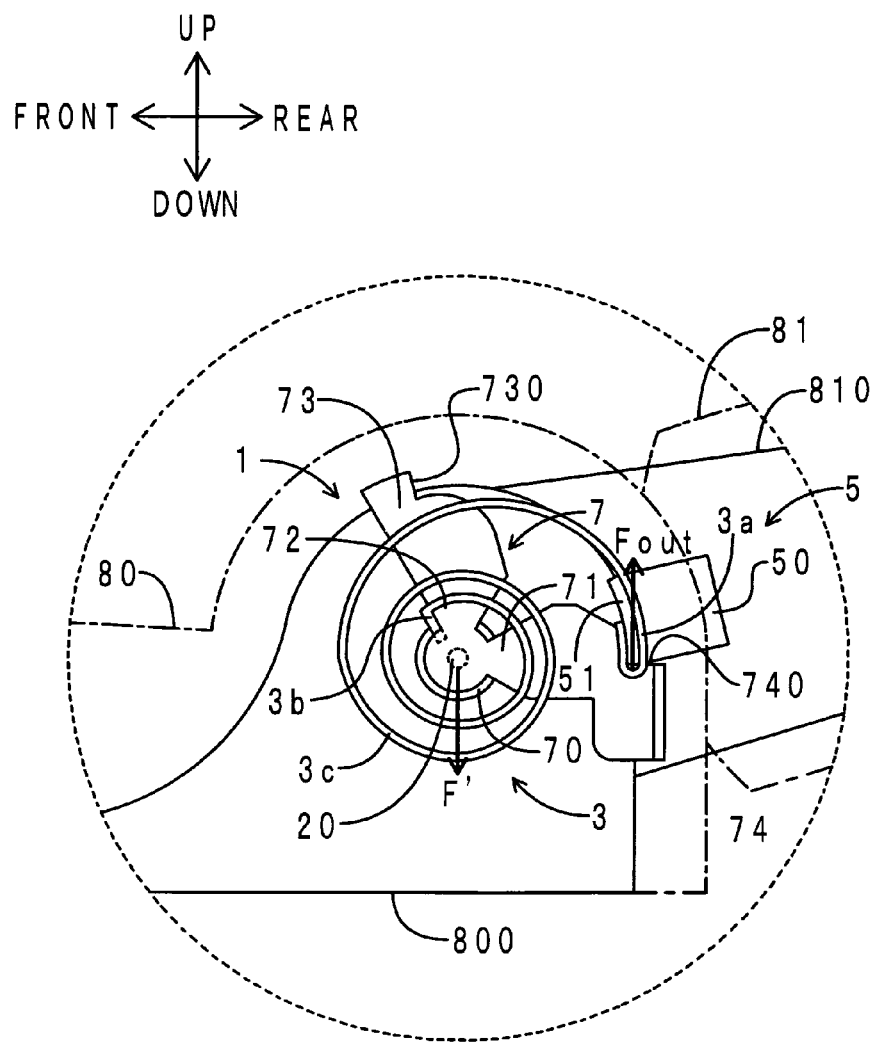
FIG. 27 is a side view showing the maximum load state of the spiral spring assembly according to the fourth embodiment.

FIG. 27 is a side view showing the maximum load state of the spiral spring assembly according to this embodiment. As shown in FIG. 27, a downward direction lateral force F' is applied to the pin 20 (i.e. the shaft 2) by the weight of the seat back 81. Meanwhile, the outer end 3a applies an upward direction load Fout to the outer end fixing member 5. The load Fout is transmitted to the shaft 2 via the outer end fixing member 5 and the back frame 810. The spiral spring assembly 1 according to this embodiment exhibits similar actions and effects to the spiral spring assembly of the first embodiment.

FIFTH EMBODIMENT

A spiral spring assembly according to this embodiment differs from the spiral spring assembly according to the second embodiment only in the method of fixing the outer end to the outer end fixing pins. This difference will be described below.

Figure 28:
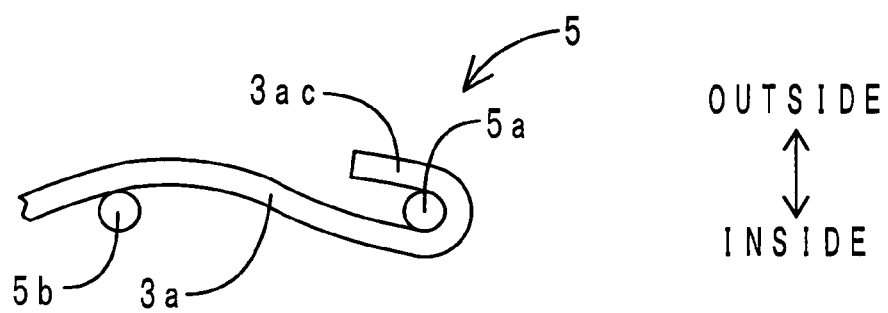
FIG. 28 is an enlarged view of the vicinity of an outer end of a spiral spring assembly according to a fifth embodiment.

FIG. 28 is an enlarged view showing the vicinity of an outer end of the spiral spring assembly according to this embodiment. Note that sites corresponding to FIG. 20 have been allocated identical reference symbols. As shown in FIG. 28, the outer end 3a is fixed to the outer end fixing pins 5a, 5b in an S shape. More specifically, the outer end 3a passes the outer diameter side of the outer end fixing pin 5b and is wound around the outer end fixing pin 5a from the inner diameter side.

The spiral spring assembly according to this embodiment exhibits similar actions and effects to the spiral spring assembly of the second embodiment. Further, according to the spiral spring assembly of this embodiment, the length of the clasp portion 3ac that is hooked onto the outer end fixing pin 5a can be made comparatively short. Therefore, wasteful parts that do not function as a spring can be eliminated from the overall spring length of the non-contact spiral spring.

SIXTH EMBODIMENT

A spiral spring assembly according to this embodiment differs from the spiral spring assembly of the second embodiment in the number of outer end fixing pins and the method of fixing the outer end to the outer end fixing pins. These differences will be described below.

Figure 29:
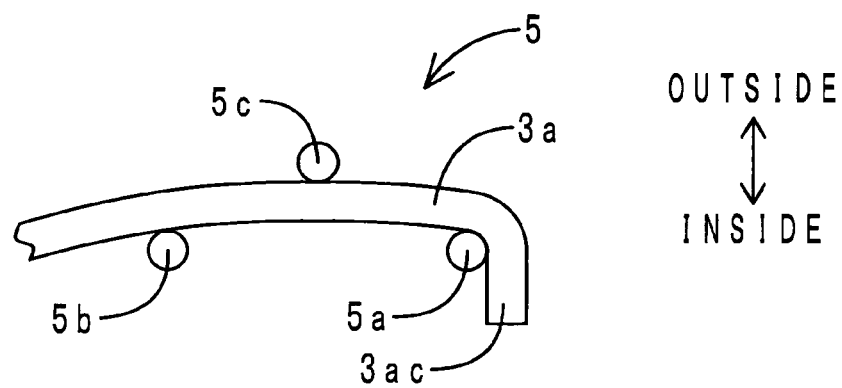
FIG. 29 is an enlarged view of the vicinity of an outer end of a spiral spring assembly according to a sixth embodiment.

FIG. 29 is an enlarged view showing the vicinity of an outer end of the spiral spring assembly according to this embodiment. Note that sites corresponding to FIG. 20 have been allocated identical reference symbols. As shown in FIG. 29, the outer end fixing member 5 has a total of three outer end fixing pins 5a, 5b, 5c. The outer end fixing pins 5a, 5b, 5c are disposed on a circumference centering on the shaft (not shown). Here, the outer end fixing pin 5c is disposed at a predetermined remove from the outer end fixing pins 5a, 5b in the outer diametrical direction. The outer end 3a is press-fitted into a diametrical direction gap between the outer end fixing pin 5c and the outer end fixing pins 5a, 5b. A tip end of the outer end 3a is wound around the outer end fixing pin 5a and bent in the inner diametrical direction.

The spiral spring assembly according to this embodiment exhibits similar actions and effects to the spiral spring assembly of the second embodiment. Further, according to the spiral spring assembly of this embodiment, the length of the clasp portion 3ac that is hooked onto the outer end fixing pin 5a can be made comparatively short. Therefore, wasteful parts that do not function as a spring can be eliminated from the overall spring length of the non-contact spiral spring. Moreover, the bending angle of the clasp portion 3ac can be reduced (to substantially 90° in this embodiment), and therefore molding of the clasp portion 3ac can be performed comparatively easily.

SEVENTH EMBODIMENT

A spiral spring assembly according to this embodiment differs from the spiral spring assembly of the second embodiment in that a pair of outer end fixing pieces is provided in place of the outer end fixing pins. This difference will be described below.

FIG. 30 is an enlarged view showing the vicinity of an outer end of the spiral spring assembly according to this embodiment. Note that sites corresponding to FIG. 20 have been allocated identical reference symbols. As shown in FIG. 30, the outer end fixing member 5 includes a total of two outer end fixing pieces 5d, 5e. The outer end fixing pieces 5d, 5e are made of steel and respectively take the form of a rectangular parallelepiped. The outer end fixing pieces 5d, 5e are disposed on a circumference centering on the shaft (not shown) so as to be separated by a predetermined interval. The tip end of the L-shaped outer end 3a is inserted into a circumferential direction gap between the outer end fixing piece 5d and the outer end fixing piece 5e from the inner diametrical direction toward the outer diametrical direction.

The spiral spring assembly according to this embodiment exhibits similar actions and effects to the spiral spring assembly of the second embodiment. Further, according to the spiral spring assembly of this embodiment, only the circumferential direction gap between the outer end fixing piece 5d and the outer end fixing piece 5e is required to fix the outer end 3a. Here, the outer end 3a is inserted into the gap. Hence, the width of the gap need to be no larger than the plate thickness of the outer end 3a. Therefore, according to the spiral spring assembly of this embodiment, the space required to install the outer end fixing member 5 can be reduced.

EIGHTH EMBODIMENT

A spiral spring assembly according to this embodiment differs from the spiral spring assembly of the first embodiment in that lateral force generated in the shaft is suppressed by the load that is generated in the inner end. This difference will be described below.

Figure 32:
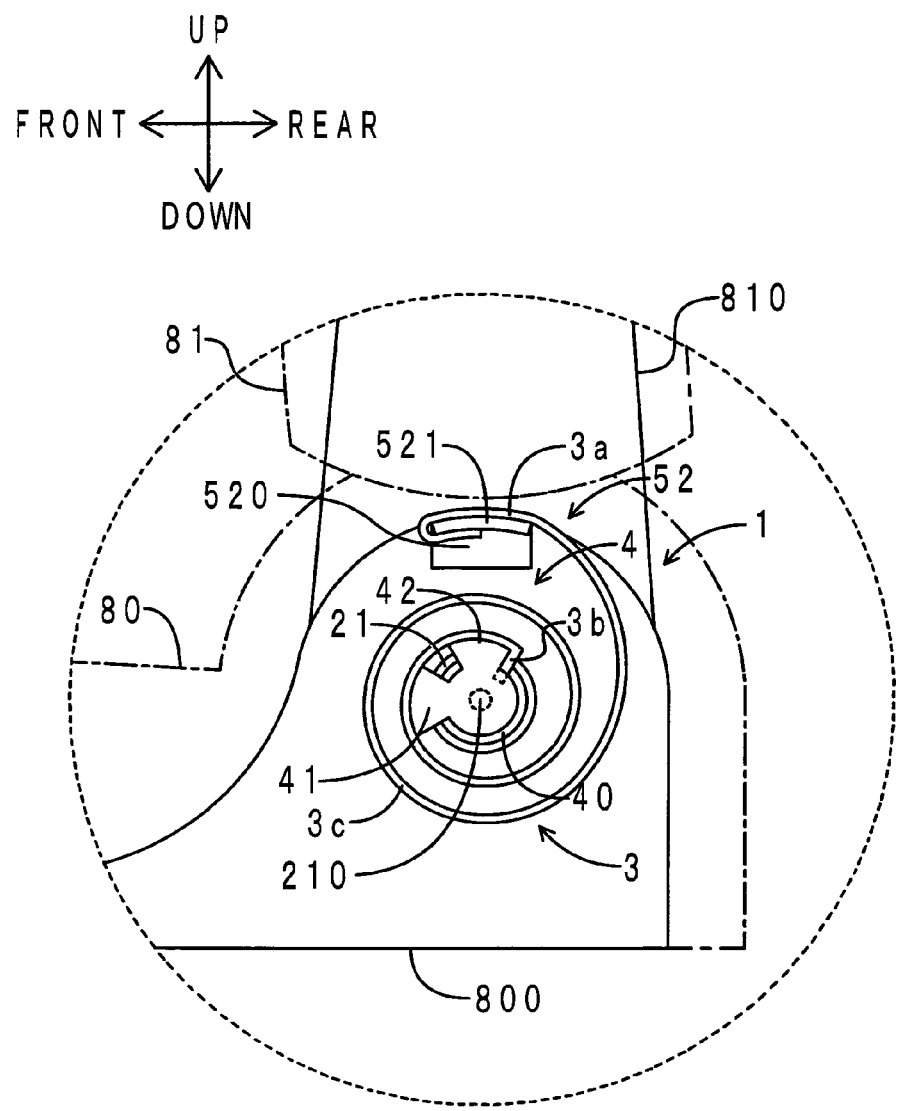
FIG. 32 is a side view showing the minimum load state of the spiral spring assembly according to the eighth embodiment.

FIG. 31 is an exploded perspective view of the spiral spring assembly according to this embodiment. Note that sites corresponding to FIG. 14 have been allocated identical reference symbols. FIG. 32 is a side view showing the minimum load state of the spiral spring assembly according to this embodiment. Note that sites corresponding to FIG. 16 have been allocated identical reference symbols.

As shown in FIGS. 31 and 32, an outer end fixing member 52 is made of steel and takes the form of an L-shaped plate. More specifically, the outer end fixing member 52 includes a base portion 520 and an outer end fixing portion 521. The base portion 520 takes a plate form and is welded to the upper end of the cushion frame 800. The outer end fixing portion 521 takes a plate form and projects in a leftward direction from the base portion 520.

A shaft 21 is made of steel and takes the form of a short axis column. The shaft 21 is included in the central shaft of the present invention. The shaft 21 projects in a leftward direction from the lower end of the back frame 810. Thus, when the back frame 810 oscillates in the front-rear direction, the shaft 21 rotates (spins) together with the back frame 810. A pin 210 projects from the left side axial end of the shaft 21. The pin 210 projects from an outer surface of the cushion frame 800.

The outer end 3a of the non-contact spiral spring 3 is fixed to the outer end fixing portion 521 of the outer end fixing member 52. Meanwhile, the inner end 3b is latched to the bridge portion 42 of the inner end fixing member 4. Note that the spiral direction of the non-contact spiral spring 3 is set in an opposite direction to the spiral direction of the non-contact spiral spring 3 shown in FIGS. 14 and 16.

Figure 33:
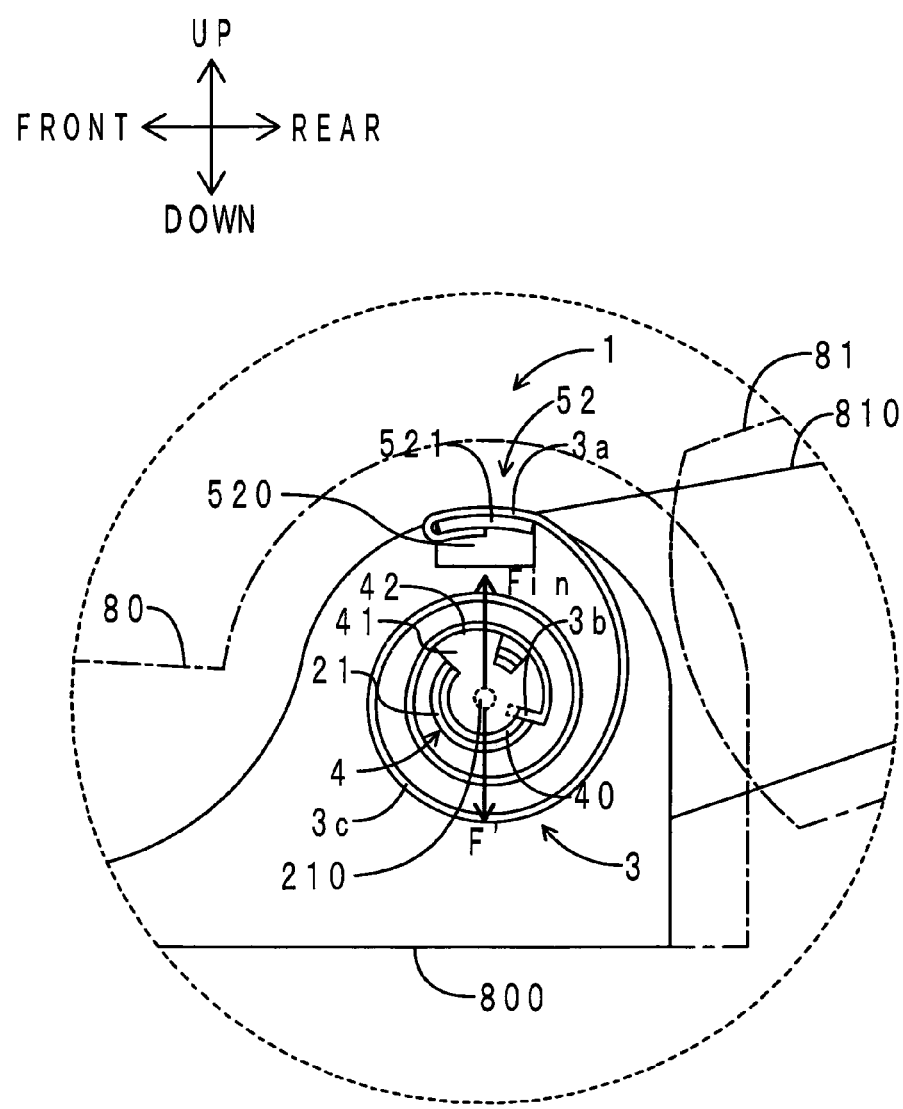
FIG. 33 is a side view showing the maximum load state of the spiral spring assembly according to the eighth embodiment.
Figure 34:
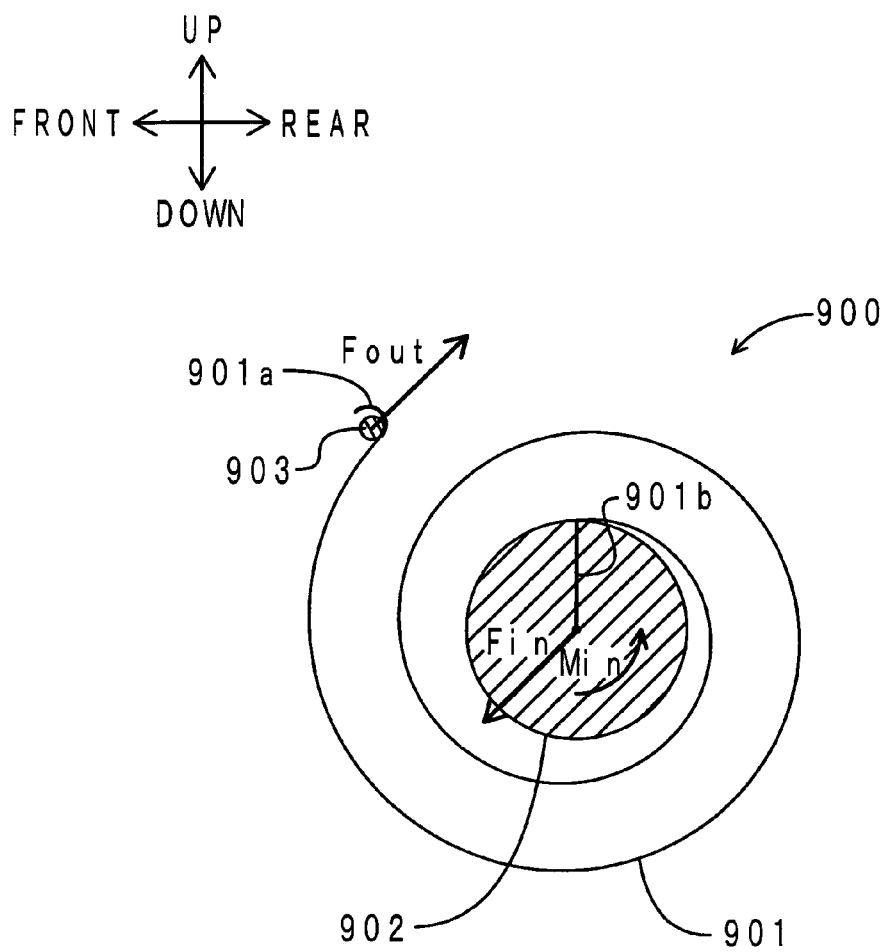
FIG. 34 is a pattern diagram of a conventional spiral spring assembly.

FIG. 33 is a side view showing the maximum load state of the spiral spring assembly according to this embodiment. Note that sites corresponding to FIG. 18 have been allocated identical reference symbols. As shown in FIG. 33, in the maximum load state, the shaft 21, or in other words the inner end fixing member 4, rotates (spins) in accordance with the rearward tilt of the back frame 810. The inner end 3b applies an upward load Fin to the inner end fixing member 4. The downward lateral force F' that is applied to the cushion frame 800 by the shaft 21 can be suppressed by this load Fin.

The spiral spring assembly according to this embodiment exhibits similar actions and effects to the spiral spring assembly of the first embodiment. Further, according to the spiral spring assembly 1 of this embodiment, the lateral force F' that is generated in the shaft 21 can be suppressed by the load Fin generated in the inner end 3b.

OTHER EMBODIMENTS

Embodiments of the spiral spring assembly according to the present invention were described above. However, the embodiments are not necessarily limited to those described above, and the present invention may be implemented in various modified and improved aspects evident to a person skilled in the art.

For example, the direction of the lateral force F' is not limited to a downward direction. For example, the direction of the lateral force F' may be changed according to the weight of the seat back 81, contact between the lower end of the seat back 81 and the rear end of the seat cushion 80, and so on.

Further, in the embodiments described above, the spiral spring assembly of the present invention is used as a reclining mechanism for the vehicle seat 8, but the spiral spring assembly of the present invention may be used as a trunk opener or a window regulator, for example.

Further, there are no particular limitations on the method of fixing the outer end 3a to the outer end fixing member 5. The outer end 3a may be fixed to the outer end fixing member 5 from the outer diametrical direction or the inner diametrical direction. In other words, any method may be employed as long as the outer end 3a does not fall off the outer end fixing member 5 during tightening. Further, any method may be employed as long as the outer end 3a is capable of transmitting torque to the outer end fixing member 5.

Further, the shaft 2 need not take the shape of a round bar, and may take the shape of an angled bar or the like. Also, the shaft 2 does not have to be disposed over the entirety of the left-right direction of the seat 8 as long as it is disposed in the oscillation center of the back frame 810 relative to the cushion frame 800. For example, a projecting portion may be formed at the rear end of the cushion frame 800, a recessed portion may be formed at the lower end of the back frame 810, and the back frame 810 may be caused to oscillate by the projecting portion and the recessed portion. In this case, the projecting portion serves as the central shaft of the present invention. Furthermore, in the embodiments described above, the minimum load state corresponds to the set state, but the minimum load state and the set state may be different.

Further, in the first embodiment, the outer end fixing portion 51 is inserted into the U-shaped interior of the outer end 3a with a predetermined clearance. However, the outer end fixing portion 51 may be pressed into the U-shaped interior of the outer end 3a. In so doing, the clearance becomes zero, and therefore torque transmission loss between the outer end 3a and the outer end fixing portion 51 becomes zero.

Furthermore, there are no particular limitations on the number of spiral spring assemblies 1 disposed in relation to the seat 8. For example, the spiral spring assembly 1 may be disposed on only one side of the left and right sides of the seat 8. There are also no particular limitations on the gripping angle between the cushion frame 800 and the back frame 810 in the minimum load state, and this angle may be approximately 60°, approximately 70°, approximately 80°, and so on, for example. There are also no particular limitations on the range of motion (the region extending from the minimum load state to the maximum load state) of the back frame 810 relative to the cushion frame 800.

Furthermore, in the embodiments described above, a "predetermined state" of the present invention (the state in which lateral force is subject to suppression) corresponds to the maximum load state, but an upright state of the seat back 81 (an operational state), for example, may correspond to the predetermined state. In this case also, lateral force can be suppressed in a similar manner to that of the embodiments described above.

Further, in the embodiments described above, a "first state" and a "second state" of the present invention correspond to the minimum load state and the maximum load state, respectively, but there are no particular limitations on the first state and second state. For example, the minimum load state may be interposed between the first state and the second state.

Furthermore, when switching from the pre-setting state to the minimum load state, the spiral spring need not to be wound. For example, the winding margin may be set at zero. Alternatively, the spiral spring may be flexed (to describe this using FIG. 3, the winding shift amount δ2 may be positive, negative, or zero).

The invention claimed is:

1. A method of assembling a spiral spring assembly that comprises a central shaft; a spiral spring that is disposed at the periphery of the central shaft and includes an outer end, an inner end, and a spiral portion that connects the outer end and the inner end in a spiral form; an inner end fixing member; and an outer end fixing member, the spiral spring being in a natural length state prior to assembly, the method comprising:
    fixing the inner end to the inner end fixing member with a structure that is capable of transmitting torque along the spiral spring;
    moving the outer end fixing member relative to the inner end fixing member within a predetermined section extending from a first state to a second state; and
    fixing the outer end to the outer end fixing member with a structure that is capable of transmitting torque along the spiral spring, wherein:
    a lateral force that is generated in the central shaft in an assembled state, in which the inner end is fixed to the inner end fixing member and the outer end is fixed to the outer end fixing member, is suppressed within the predetermined section, and at least one of the following conditions is satisfied:
        (i) a diametrical distance between the inner end and the outer end in the natural length state is different from that between the inner end and the outer end in the assembled state; and
        (ii) in the natural length state, the outer end and the outer end fixing member are disposed such that respective extension directions thereof intersect, and in the assembled state, the outer end and the outer end fixing member are disposed such that respective extension directions thereof are substantially parallel.

2. The method of assembling a spiral spring assembly according to claim 1, wherein the first state is a minimum load state within the predetermined section, in which an elastic energy stored in the spiral spring is at a minimum, and the second state is a maximum load state within the predetermined section, in which the elastic energy is at a maximum.

3. The method of assembling a spiral spring assembly according to claim 2, wherein in the minimum load state, the outer end applies a load to the outer end fixing member in at least one direction of a diametrical direction and a tangential direction.

4. The method of assembling a spiral spring assembly according to claim 1, wherein the spiral spring is a non-contact spiral spring in which adjacent parts thereof in a diametrical direction do not contact each other in the natural length state before the outer end and the outer end fixing member are fixed and in which the inner end and the inner end fixing member are fixed.

5. The method of assembling a spiral spring assembly according to claim 4, wherein in the assembled state, the spiral portion is defined, in relation to a boundary line that extends in a substantially perpendicular direction to the direction of a load applied to the outer end by the outer end fixing member and passes through an axial center of the central shaft, by a load side section positioned in the direction of the load and an anti-load side section positioned on the opposite side of the boundary line to the load side section, and in the natural length state, an average pitch of parts constituting the anti-load side section, excluding a part that forms a continuation of the outer end, is set to be larger than an average pitch of parts constituting the load side section.

6. The method of assembling a spiral spring assembly according to claim 1, wherein the assembled state is a maximum load state within the predetermined section, in which an elastic energy stored in the spiral spring is at a maximum.

7. The method of assembling a spiral spring assembly according to claim 1, wherein the outer end is fixed to the outer end fixing member by being in contact with opposite sides of the outer end fixing member.

8. The method of assembling a spiral spring assembly according to claim 1, wherein opposite sides of the outer end are in contact with the outer end fixing member.

9. The method of assembling a spiral spring assembly according to claim 1, further comprising winding the outer end inward around the outer end fixing member from a diametrically outward side.

10. The method of assembling a spiral spring assembly according to claim 1, further comprising:

before the outer end and the outer end fixing member are fixed and after the inner end and the inner end fixing member are fixed, disposing the outer end in an outer diametrical direction of the outer end fixing member.

11. The method of assembling a spiral spring assembly according to claim 10, further comprising winding the outer end outward around the outer end fixing member from a diametrically inward side.

12. The method of assembling a spiral spring assembly according to claim 1, wherein the condition (i) is satisfied.

13. The method of assembling a spiral spring assembly according to claim 1, wherein the condition (ii) is satisfied.

14. The method of assembling a spiral spring assembly according to claim 1, wherein the conditions (i) and (ii) are satisfied.

* * * * *